(12) United States Patent
Thibault

(10) Patent No.: US 10,377,401 B2
(45) Date of Patent: Aug. 13, 2019

(54) INTERCHANGEABLE AND MODULAR CARTS

(71) Applicant: Richard Thibault, Clinton Township, MI (US)

(72) Inventor: Richard Thibault, Clinton Township, MI (US)

(*) Notice: Subject to any disclaimer, the term of this patent is extended or adjusted under 35 U.S.C. 154(b) by 0 days.

(21) Appl. No.: 15/592,762

(22) Filed: May 11, 2017

(65) Prior Publication Data

US 2017/0327139 A1    Nov. 16, 2017

Related U.S. Application Data

(60) Provisional application No. 62/335,308, filed on May 12, 2016.

(51) Int. Cl.
*B62B 3/02* (2006.01)
*B62B 5/00* (2006.01)
*B60L 1/00* (2006.01)
*B62B 3/00* (2006.01)
*B62B 3/10* (2006.01)
*B60L 50/52* (2019.01)

(52) U.S. Cl.
CPC .............. *B62B 3/02* (2013.01); *B60L 1/006* (2013.01); *B60L 50/52* (2019.02); *B62B 3/005* (2013.01); *B62B 3/102* (2013.01); *B62B 5/0033* (2013.01); *B60L 2200/00* (2013.01); *B60L 2220/16* (2013.01); *Y02T 10/7005* (2013.01)

(58) Field of Classification Search
CPC .. B62B 3/00; B62B 3/02; B62B 3/102; B62B 3/005; B62B 3/001; B62B 3/04; B62B 5/0026; B62B 5/0033; B62B 5/0053; B62B 5/0056; B62B 2202/028; B62B 2202/20; B60L 1/006; B60L 1/00; B60L 1/14; B60L 11/1805; B60L 11/18; B60L 11/1809
See application file for complete search history.

(56) References Cited

U.S. PATENT DOCUMENTS

| | | | |
|---|---|---|---|
| 422,729 | A | 3/1890 | Clark |
| 630,734 | A | 8/1899 | Oothout |
| 1,328,458 | A | 1/1920 | Schiek |
| 1,603,212 | A | 10/1926 | Raymond |
| 1,628,722 | A | 5/1927 | Haertel |

(Continued)

OTHER PUBLICATIONS

Potentially related U.S. Appl. No. 12/481,013, filed Jun. 9, 2009, published as US 2010/0230920 on Sep. 16, 2010, issued as U.S. Pat. No. 8,376,376 on Feb. 19, 2013.

(Continued)

*Primary Examiner* — James M Dolak
(74) *Attorney, Agent, or Firm* — The Dobrusin Law Firm, PC

(57) ABSTRACT

A mobile platform comprising: (a) one or more platforms to support one or more cartridges, (b) one or more compartments within the one or more platforms, (c) one or more vertical supports connected to the one or more platforms, (d) a plurality of wheels connected to a bottom of the one or more platforms, and (e) one or more recesses located in the one or more platforms to receive one or more support accessories, wherein the one or more compartments are shaped to receive the one or more cartridges so that the one or more cartridges are secured to the one or more platforms during movement.

16 Claims, 19 Drawing Sheets

(56) References Cited

U.S. PATENT DOCUMENTS

| | | |
|---|---|---|
| 2,308,180 A | 1/1943 | Larsen et al. |
| 2,321,981 A | 6/1943 | Bowers |
| 2,424,644 A | 7/1947 | Barrett |
| 2,531,131 A | 11/1950 | Johnson |
| 2,573,085 A | 10/1951 | Yonkers |
| 2,665,922 A | 1/1954 | Bard |
| 2,707,351 A | 5/1955 | Walker |
| 2,840,384 A | 1/1956 | Bard |
| 2,772,889 A | 12/1956 | Reynolds |
| 2,798,732 A | 7/1957 | Craig |
| 2,922,176 A | 6/1958 | Bernhardt |
| 2,862,220 A | 12/1958 | Orr |
| 2,917,769 A | 12/1959 | Kasper |
| 2,923,416 A | 2/1960 | Vogel |
| 2,947,548 A | 8/1960 | Bard |
| 3,013,807 A | 12/1961 | Winterhoff |
| 3,031,207 A | 4/1962 | Bard |
| 3,233,912 A | 2/1966 | Chusid et al. |
| 3,554,573 A | 1/1971 | Miller |
| 3,558,152 A | 1/1971 | Miles et al. |
| D222,951 S | 2/1972 | Stringer |
| 3,734,527 A | 5/1973 | Bard |
| 3,752,494 A | 8/1973 | Dunn |
| 3,845,968 A | 11/1974 | Larson |
| 3,996,950 A | 12/1976 | Mier |
| 4,167,271 A | 9/1979 | Jorgensen |
| 4,179,153 A | 12/1979 | Cole, Jr. |
| 4,240,684 A | 12/1980 | Henning |
| 4,294,374 A | 10/1981 | Ames |
| 4,313,612 A | 2/1982 | Rubens |
| 4,366,998 A | 1/1983 | Kaiser |
| 4,373,761 A | 2/1983 | Hansberry, Jr. |
| 4,449,322 A | 5/1984 | Blumenthal |
| 4,458,963 A | 7/1984 | Keddie |
| 4,475,660 A | 10/1984 | Cain |
| 4,488,603 A * | 12/1984 | Schmittmann ......... A62C 27/00 169/24 |
| 4,488,733 A | 12/1984 | Hellsten |
| 4,542,909 A | 9/1985 | Littwin et al. |
| 4,550,828 A | 11/1985 | Baldwin et al. |
| 4,635,951 A | 1/1987 | Berfield et al. |
| 4,763,907 A | 8/1988 | Raymond |
| 4,775,067 A | 10/1988 | Mount |
| 4,799,699 A | 1/1989 | Berfield et al. |
| 4,861,050 A | 8/1989 | Bergeron |
| 4,908,904 A | 3/1990 | Smith, Jr. |
| 4,976,450 A * | 12/1990 | Ellefson ..................... A47F 5/05 108/103 |
| 4,993,551 A | 2/1991 | Lindsay |
| 4,993,726 A | 2/1991 | Schumacher et al. |
| 5,040,808 A | 8/1991 | McIntyre |
| 5,046,749 A | 9/1991 | Owens |
| 5,072,955 A | 12/1991 | Holland et al. |
| 5,074,572 A | 12/1991 | Delmerico et al. |
| 5,078,414 A * | 1/1992 | Court ....................... A47B 31/04 108/50.01 |
| 5,088,751 A | 2/1992 | Zint |
| 5,089,037 A | 2/1992 | Marsolais |
| 5,110,147 A | 5/1992 | Gershman |
| 5,123,667 A | 6/1992 | Stolzman |
| 5,163,695 A | 11/1992 | Pakowsky |
| 5,174,447 A | 12/1992 | Fleming |
| 5,183,280 A | 2/1993 | Gresch |
| 5,207,345 A | 5/1993 | Stewart et al. |
| 5,242,050 A | 9/1993 | Billings |
| 5,253,887 A | 10/1993 | Marenger |
| 5,253,972 A | 10/1993 | Drew et al. |
| 5,275,281 A | 1/1994 | Ebeling |
| 5,380,033 A | 1/1995 | Harling |
| 5,433,463 A | 7/1995 | Finley |
| 5,472,220 A | 12/1995 | Stephan |
| 5,492,346 A | 2/1996 | Stadler et al. |
| 5,575,490 A | 11/1996 | Simpson, Jr. |
| 5,611,551 A | 3/1997 | Lin |
| 5,615,902 A | 4/1997 | Reurich |
| 5,687,443 A | 11/1997 | Moore |
| 5,713,583 A | 2/1998 | Hansen |
| 5,722,118 A | 3/1998 | Hansen et al. |
| 5,806,867 A | 9/1998 | Hampton |
| 5,853,180 A | 12/1998 | Taylor |
| 5,860,659 A | 1/1999 | Hart |
| 5,897,018 A | 4/1999 | Pruitt |
| 5,967,554 A | 10/1999 | Kanta |
| 5,971,333 A | 10/1999 | Fiedor |
| 6,010,187 A | 1/2000 | Dallas et al. |
| 6,027,128 A | 2/2000 | Stitch et al. |
| 6,053,516 A | 4/2000 | Ottaway |
| 6,098,732 A * | 8/2000 | Romick ................... B62B 3/008 180/209 |
| 6,135,467 A | 10/2000 | Tagariello |
| 6,138,827 A | 10/2000 | Marshall |
| 6,170,118 B1 | 1/2001 | McIntyre et al. |
| 6,176,500 B1 | 1/2001 | Clement, Jr. et al. |
| 6,179,306 B1 | 1/2001 | Maxwell |
| 6,209,891 B1 | 4/2001 | Herrmann |
| RE37,350 E | 9/2001 | Stephan |
| 6,315,310 B1 | 11/2001 | Hurt |
| 6,386,557 B1 | 5/2002 | Weldon |
| 6,419,246 B1 | 7/2002 | Neal |
| 6,425,590 B1 | 7/2002 | Whiteside et al. |
| D463,124 S | 9/2002 | Godshaw et al. |
| 6,488,293 B1 | 12/2002 | Mitchell et al. |
| 6,520,513 B2 | 2/2003 | Presley-Mays |
| 6,520,609 B1 | 2/2003 | Beauregard et al. |
| 6,648,349 B1 | 11/2003 | Waller et al. |
| 6,695,325 B2 | 2/2004 | Carrillo |
| 6,698,771 B1 | 3/2004 | Bergeron |
| 6,729,631 B2 | 5/2004 | Trine et al. |
| 6,733,017 B2 | 5/2004 | Intravatola |
| 6,736,415 B1 | 5/2004 | Lenihan |
| 6,742,747 B1 | 6/2004 | Timmons, Jr. |
| 6,746,039 B2 | 6/2004 | Perelli et al. |
| 6,755,302 B1 | 6/2004 | Streich et al. |
| 6,758,482 B2 | 7/2004 | Stallbaumer |
| 6,779,225 B1 | 8/2004 | Bellarosa, III |
| 6,815,036 B1 | 11/2004 | Romero |
| 6,827,357 B2 | 12/2004 | Calmeise et al. |
| 6,851,566 B1 | 2/2005 | Bonner |
| 6,857,644 B2 | 2/2005 | Hsiao |
| 6,877,828 B2 | 4/2005 | Strong |
| 6,953,114 B2 | 10/2005 | Wang |
| 6,964,423 B1 | 11/2005 | Chieh et al. |
| 7,111,852 B2 * | 9/2006 | Woods ....................... B62B 3/00 280/47.34 |
| 7,201,385 B2 | 4/2007 | Renz et al. |
| 7,210,545 B1 * | 5/2007 | Waid ..................... B60K 7/0007 180/19.1 |
| 7,240,910 B2 | 7/2007 | Stuemke |
| 7,273,216 B2 | 9/2007 | Hohrman |
| 7,306,245 B1 | 12/2007 | Lowe |
| 7,325,814 B2 | 2/2008 | Sparacino |
| 7,357,398 B2 | 4/2008 | O'Connor |
| 7,360,284 B1 | 4/2008 | Viani |
| 7,364,172 B1 | 4/2008 | Archer |
| 7,419,169 B2 | 9/2008 | Intravatola |
| 7,427,076 B2 | 9/2008 | Gwin |
| 7,434,688 B2 | 10/2008 | Hu |
| 7,516,977 B2 | 4/2009 | Wu et al. |
| 7,531,917 B2 | 5/2009 | Stone et al. |
| 7,635,037 B2 | 12/2009 | Treadwell et al. |
| 7,661,685 B2 | 2/2010 | Thibault |
| 7,686,171 B1 | 3/2010 | Shakes et al. |
| 7,823,907 B1 | 11/2010 | Coholan |
| 7,845,441 B2 * | 12/2010 | Chambers ............... B62B 1/002 180/19.1 |
| 7,845,656 B2 | 12/2010 | Thompson |
| 7,857,328 B1 | 12/2010 | Boss |
| 7,887,016 B2 | 2/2011 | Gunsaullus |
| 7,917,992 B2 | 4/2011 | McIntyre |
| 7,942,429 B2 | 5/2011 | Hill |
| 8,087,678 B2 | 1/2012 | Nowak |
| 8,141,666 B2 * | 3/2012 | Ganiere ................... B60L 1/003 180/2.2 |

(56) References Cited

U.S. PATENT DOCUMENTS

| | | | | |
|---|---|---|---|---|
| 8,276,692 | B1* | 10/2012 | Nwaeke | B62B 5/003 180/19.1 |
| 8,371,404 | B2* | 2/2013 | Boeckler | B62B 1/002 180/214 |
| 8,376,376 | B2 | 2/2013 | Thibault | |
| 8,668,209 | B1* | 3/2014 | Anzivino | B62B 1/002 280/47.12 |
| 8,991,529 | B2* | 3/2015 | Bryant | B62D 51/04 180/19.2 |
| D734,586 | S | 7/2015 | Thibault | |
| 9,227,645 | B2 | 1/2016 | Franco | |
| 9,242,662 | B2* | 1/2016 | Scott | B62B 1/16 |
| 9,256,865 | B2* | 2/2016 | Knoll | G07G 1/0018 |
| D783,218 | S | 4/2017 | Thibault | |
| 10,046,798 | B2* | 8/2018 | Reeves | B62D 1/02 |
| 10,053,128 | B2* | 8/2018 | Rackleff | B60D 1/58 |
| 10,080,543 | B2* | 9/2018 | Coimbatore Renukanandhan | A61B 8/00 |
| 10,086,859 | B2* | 10/2018 | Chen | B62B 3/02 |
| 2002/0056967 | A1 | 5/2002 | Carrillo | |
| 2002/0112309 | A1 | 8/2002 | Rougeau | |
| 2003/0020249 | A1 | 1/2003 | Webster et al. | |
| 2003/0020261 | A1 | 1/2003 | Perelli et al. | |
| 2003/0052465 | A1 | 3/2003 | Ahmed et al. | |
| 2003/0102644 | A1 | 6/2003 | Figueroa | |
| 2003/0213090 | A1 | 11/2003 | Holsten et al. | |
| 2003/0227148 | A1 | 12/2003 | Shipman et al. | |
| 2004/0099703 | A1 | 5/2004 | Schoenberger | |
| 2004/0104550 | A1 | 6/2004 | Do | |
| 2004/0145139 | A1 | 7/2004 | Kershaw | |
| 2004/0183268 | A1 | 9/2004 | Hartsock | |
| 2004/0232639 | A1 | 11/2004 | Chiappetta et al. | |
| 2004/0245735 | A1 | 12/2004 | Pins | |
| 2004/0245736 | A1 | 12/2004 | Intravatola | |
| 2005/0011037 | A1* | 1/2005 | Zhao | A47L 9/009 15/323 |
| 2005/0280228 | A1 | 12/2005 | Fernandes et al. | |
| 2006/0066064 | A1 | 3/2006 | Hardy | |
| 2006/0103090 | A1 | 5/2006 | Fernandes et al. | |
| 2006/0157946 | A1 | 7/2006 | Stuemke | |
| 2006/0186000 | A1 | 8/2006 | Gregory et al. | |
| 2006/0208440 | A1 | 9/2006 | Clark et al. | |
| 2006/0214384 | A1 | 9/2006 | Gwin | |
| 2006/0228201 | A1* | 10/2006 | Lenceski | A63B 71/0036 414/466 |
| 2007/0096413 | A1 | 5/2007 | Staracino | |
| 2007/0182114 | A1 | 8/2007 | Fernandes et al. | |
| 2007/0226945 | A1 | 10/2007 | McIntyre | |
| 2008/0054582 | A1 | 3/2008 | Thibault | |
| 2008/0185802 | A1 | 8/2008 | Fleming | |
| 2008/0197587 | A1 | 8/2008 | Nowak | |
| 2008/0223071 | A1 | 9/2008 | Vanderberg et al. | |
| 2008/0272566 | A1 | 11/2008 | Thompson | |
| 2009/0050761 | A1 | 2/2009 | Gunsaullus | |
| 2009/0294322 | A1 | 12/2009 | Baltz | |
| 2009/0302563 | A1 | 12/2009 | Thibault | |
| 2010/0154464 | A1 | 6/2010 | Vanderberg et al. | |
| 2010/0224699 | A1 | 9/2010 | Gaddis et al. | |
| 2010/0230920 | A1 | 9/2010 | Thibault | |
| 2010/0320709 | A1 | 12/2010 | Williamson | |
| 2010/0327665 | A1 | 12/2010 | Vidana | |
| 2011/0101780 | A1 | 5/2011 | Johnson | |
| 2013/0241165 | A1 | 9/2013 | Boivin et al. | |
| 2013/0313029 | A1 | 11/2013 | Franco | |
| 2015/0028616 | A1 | 1/2015 | Kroening et al. | |
| 2015/0344053 | A1 | 12/2015 | McClanahan et al. | |

OTHER PUBLICATIONS

Potentially related Design U.S. Appl. No. 29/489,937, filed May 5, 2014, issued as U.S. Pat. No. D. 734,586 on Jul. 14, 2015.
Potentially related Design U.S. Appl. No. 29/529,322, filed Jun. 5, 2015, issued as U.S. Pat. No. D. 783,218 on Apr. 4, 2017.
Potentially related U.S. Appl. No. 11/469,923, filed Sep. 5, 2006, published as US 2008/0054582 on Mar. 6, 2008, issued as U.S. Pat. No. 7,661,685 on Feb. 16, 2010.

* cited by examiner

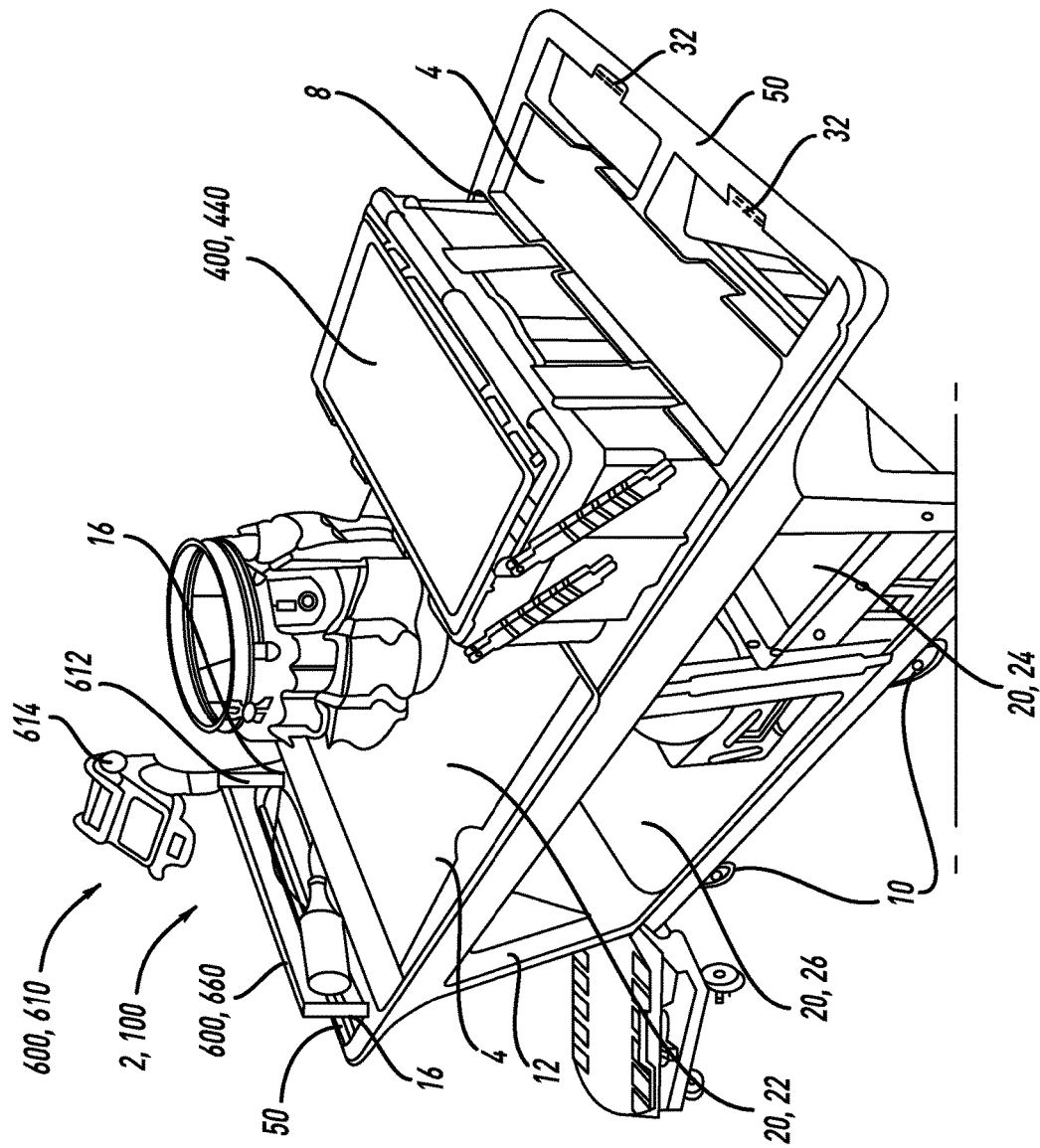

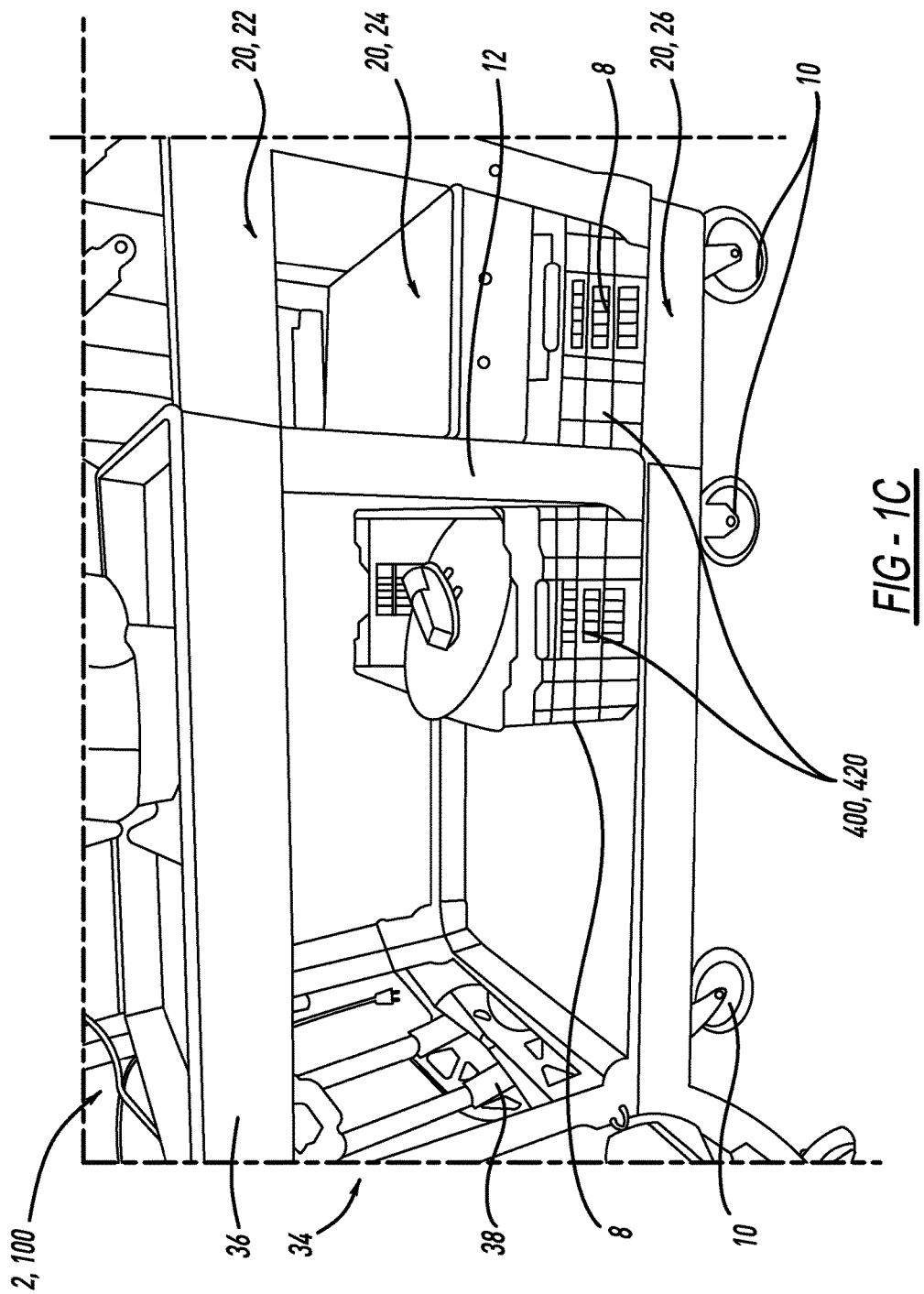

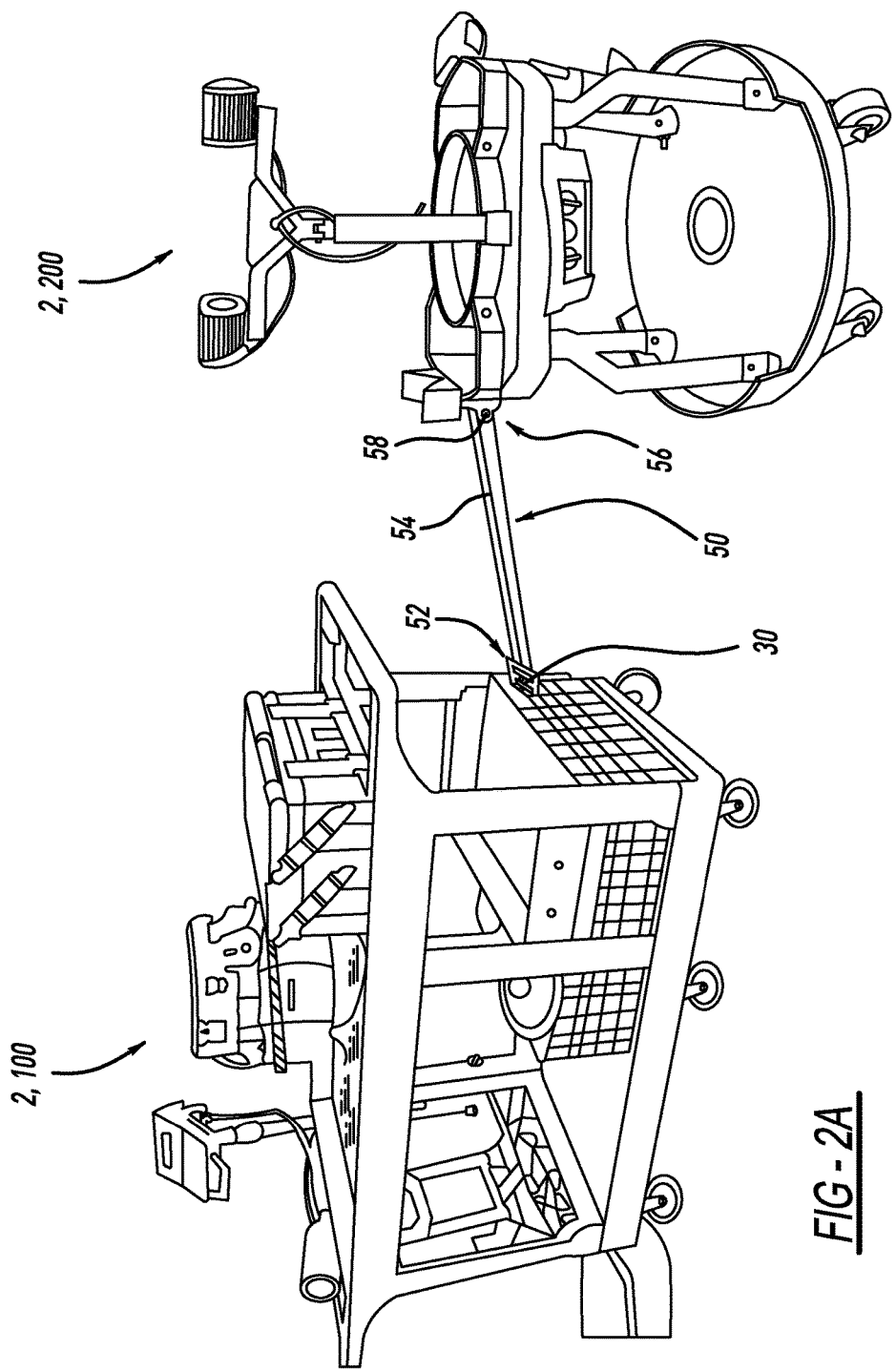

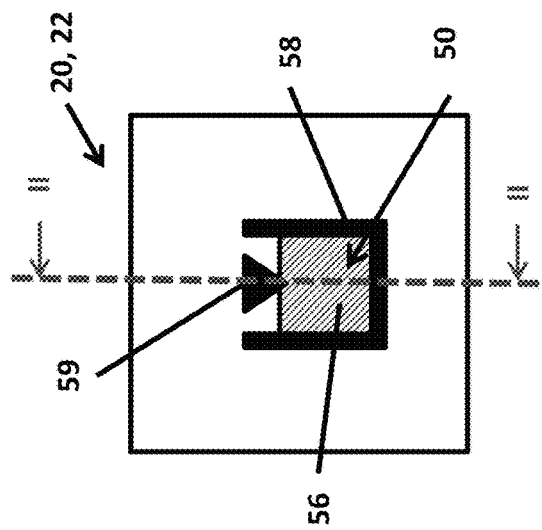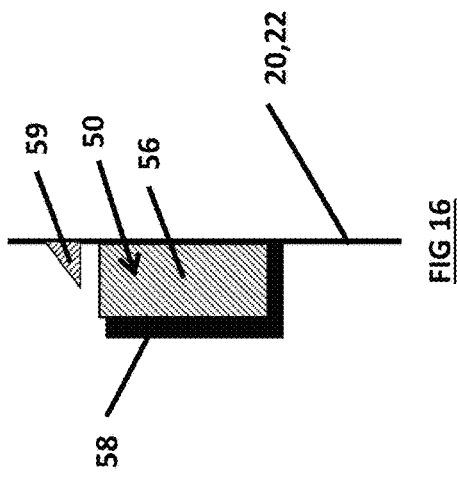
FIG 15
FIG 16

INTERCHANGEABLE AND MODULAR CARTS

FIELD

The present teachings generally relate to one or more mobile platforms which are adapted to receive and support one or more cartridges interchangeably, providing a convenient and efficient method of transporting items.

BACKGROUND

The present teachings are predicated upon providing a convenient and easy method of transporting items or materials from a first location to a desired location for any given task. The use of a cart to support and transport items is well known in the prior art. The prior art has an abundance of various sizes and shapes of carts designed to transport specific items or equipment for certain tasks. An example of a cart for industrial vacuum cleaning is found in Marsolais, U.S. Pat. No. 5,089,037, the teachings of which are expressly incorporated by reference herein in their entirety for all purposes. The design has integrated a vacuum, batteries, and a plurality of compartments directly into the cart to allow for mobile use of the vacuum for cleaning. In Presley-Mays, U.S. Pat. No. 6,520,513, there is disclosed a garden cart consisting of a hollow frame, seat, umbrella, removable toolbox, and attachment points for a plurality of garden equipment.

Lenihan, U.S. Pat. No. 6,736,415, discloses a toy push cart frame including a base portion to support a plurality of interchangeable frame attachments. The interchangeable frame attachments include a basket, tool box, or a work bench. The work bench attachment includes a plurality of pull-out drawers for storage, a top work surface, and a plurality of recesses to receive one or more toy tools. Finally, Franco, U.S. Pat. No. 9,227,645 discloses modular customizable carts with a plurality of compartments allowing a user to connect two or more carts together for transportation.

Although these various prior art carts solve some of the shortcomings of the prior art, many provide solutions only for single problems identified for specific tasks. Therefore, it would be attractive to have a mobile cart for transporting one or more cartridges from one location to a desired location. It would also be attractive to have one or more cartridges for organizing and transporting specific items for a plethora of tasks. Additionally, it would be attractive to have the one or more cartridges be interchangeable between a plurality of mobile carts ranging in size and shape. What is needed is one or more mobile carts that can efficiently and conveniently transport one or more cartridges, while the one or more cartridges can organize different items for specific tasks and be interchangeable between the one or more carts.

SUMMARY

The present teachings meet one or more (if not all) of the present needs by providing a mobile platform comprising: (a) one or more platforms to support one or more cartridges, (b) one or more compartments within the one or more platforms, (c) one or more vertical supports connected to the one or more platforms, (d) a plurality of wheels connected to a bottom of the one or more platforms, and (e) one or more recesses located in the one or more platforms to receive one or more support accessories, wherein the one or more compartments are shaped to receive the one or more cartridges so that the one or more cartridges are secured to the one or more platforms during movement.

The present teachings provide a kit of mobile platforms including: (a) one or more cartridges, (b) a large mobile platform comprising: (i) a bottom platform, (ii) an intermediate platform, wherein one or more vertical supports connect a top surface of the bottom platform to a bottom surface of the intermediate platform, (iii) a top platform, wherein one or more vertical supports connect a top surface of the intermediate platform and the top surface of the bottom platform to a bottom surface of the top platform, (iv) a plurality of wheels connected to a bottom surface of the bottom platform, (v) a hitch, (vi) one or more outrigger receiving portions to secure one or more outriggers of the one or more cartridges, (vii) one or more recesses located in a top surface of the bottom platform, the intermediate platform, or the top platform, or a combination thereof, to receive one or more support accessories, (viii) one or more compartments within the bottom platform, the intermediate platform, or the top platform, or a combination thereof, shaped to receive and secure the one or more cartridges during movement, (ix) one or more handles, and (x) an attachment mechanism fastened to the end of the large mobile platform comprising: (1) an upper attachment fastened to an end of the top platform, and (2) a lower attachment fastened to the end of the one or more vertical supports connecting the bottom platform and the top platform, (c) a medium mobile platform comprising: (i) a bottom platform, (ii) a top platform, wherein one or more vertical supports connect a top surface of the bottom platform to a bottom surface of the second platform, (iii) a plurality of wheels connected to a bottom of the first platform, (iv) one or more recesses located in a top surface of the bottom platform, the top platform, or both, to receive one or more support accessories, (v) one or more compartments within the bottom platform, the top platform, or both, shaped to receive and secure the one or more cartridges during movement, (vi) a handle removably attached to the hitch of the large mobile platform comprising: (1) a grip end, (2) a shaft extending from the grip end, and (3) a shaft end on an opposing end of the grip end, (vii) an attachment bracket mounted to a side of the top platform to receive the shaft end of the handle and secures the handle, and (viii) a power module attached to the bottom surface of the top platform comprising: (1) a housing, (2) a rechargeable battery enclosed within the housing, (3) a voltmeter connected to the rechargeable battery and enclosed within the housing, (4) a voltmeter display connected to the voltmeter and secured on an outside wall of the housing to provide a user with a voltage reading, and (5) one or more power outlets pressed into the housing and connected to the rechargeable battery, and (d) a small mobile platform comprising: (i) a platform, (ii) a plurality of wheels connected to a bottom surface of the platform, (iii) one or more recesses located in the first platform for receiving one or more support accessories, and (iv) one or more compartments shaped to receive and secure the one or more cartridges during movement; wherein the one or more cartridges are interchangeable between the large mobile platform, the medium mobile platform, and the small mobile platform; wherein the kit includes a seat comprising: (a) a pad located on a top surface of the seat, (b) an attachment surface on a bottom surface of the seat, and (c) one or more attachment hooks protruding from the attachment surface to secure to the small mobile platform or medium mobile platform; wherein the one or more attachment hooks fasten the seat to a top surface of the one or more platforms to prevent accidental movement of the seat relative to the small mobile platform or the medium mobile platform during use; and wherein the seat is interchangeable between the medium mobile platform and the small mobile platform.

The present teachings provide a mobile cart for transporting one or more cartridges from one location to a desired location. The present teachings provide one or more cartridges for organizing and transporting specific items for a plethora of tasks. The present teachings provide one or more cartridges interchangeable between a plurality of mobile carts ranging in size and shape. The present teachings provide one or more mobile carts that efficiently and conveniently transport one or more cartridges, while the one or more cartridges organize different items for specific tasks and are interchangeable between the one or more carts.

BRIEF DESCRIPTION OF THE DRAWINGS

FIG. 1A illustrates a perspective view of a mobile platform;
FIG. 1C illustrates a different close-up view of a mobile platform;
FIG. 2A illustrates a perspective view of two mobile platforms;
FIG. 15 illustrates close-up view I-I of the handle attached to the mobile platform of FIG. 11;
and
FIG. 16 illustrates cross-sectional view II-II of FIG. 15.

DETAILED DESCRIPTION

Figure 1B:
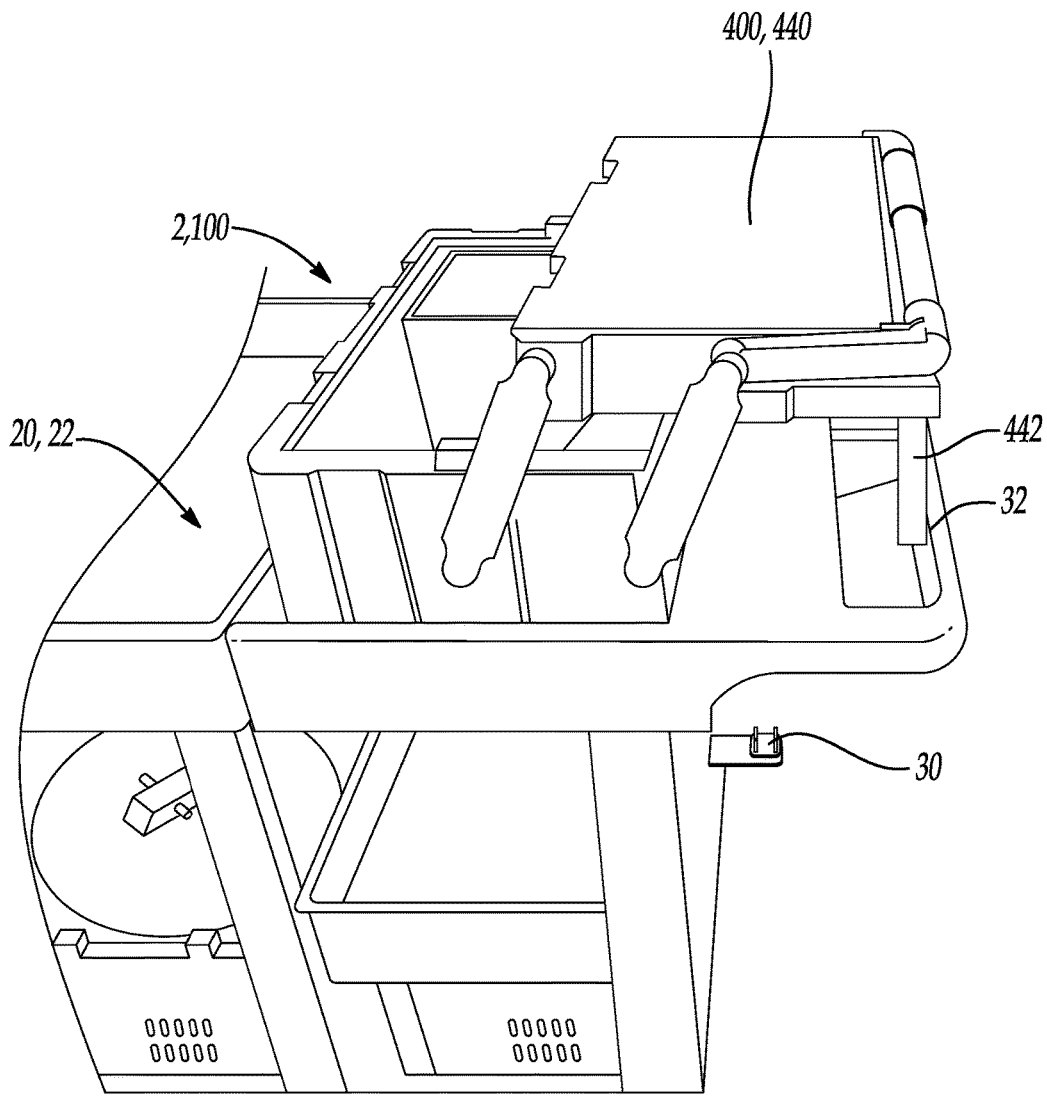
FIG. 1B illustrates a close-up view of a mobile platform.

The explanations and illustrations presented herein are intended to acquaint others skilled in the art with the invention, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide an improved mobile platform. The mobile platform functions to provide an elevated mobile support region so that a user can move one or more cartridges, tools, accessories, maintenance items, or a combination thereof to a location of interest. The mobile platform functions to retain one or more cartridges so that a user can move the cartridges between locations and allows a user to change the cartridges so that a different cartridge may be used for a different job or when different contents (e.g., tools) are needed for a different task. The mobile platform may allow users easy access to equipment and materials necessary for any task. The mobile platform may organize the equipment and materials to allow users retrieval of the equipment and materials without obstruction. The mobile platform may be collapsible. Individual components may be removed, detached, added, connected, or a combination thereof to the mobile platform. The mobile platform may be structurally rigid to support the weight of the items. The mobile platform may support about 25 Kg or more of items, about 50 Kg or more of items, about 75 Kg or more of items, about 100 Kg or more of items, preferably about 150 Kg or more of items, or more preferably about 175 Kg or more of items. The mobile platform may support about 500 Kg or less, about 450 Kg or less, or about 400 Kg or less. The mobile platform may be comprised of a variety of materials. The mobile platform may be created from metals, such as aluminum or steel, plastic, a polymer, an overmolded material, a composite, a natural material, a synthetic material, an alloy, or a combination thereof. Preferably, when the mobile platform is made of metal the platform is iron, steel, aluminum, or a combination thereof. The steel may be AISI 1008 steel carbon steel, AISI 1010 steel, or high-strength low-alloy (HSLA) steel. The mobile platform may be made from plastic. The plastic may be polyamide nylon 6, polyamide nylon 66, polyamide 12, polycarbonate, PET thermoplastic polyester resin, or polystyrene. The mobile platform may be comprised of one material, or a plurality of materials. The materials may be injection-molded, stamped, or cast. The mobile platform may have different components that are each made of different material. For example, the vertical supports may be made of metal and the platforms may be made of a plastic. The mobile platform may vary in dimensional size and shape. The mobile platform may be round, oval, rectangular, trapezoidal, square, symmetrical, asymmetrical, oblong, or a combination thereof. The mobile platform may include one or more platforms to support and secure the items. The mobile platform may include one or more platforms. The mobile platform may include a plurality of platforms. The mobile platform includes one or more wheels and preferably a plurality of wheels. The mobile platform may include a hitch. The mobile platform may include a handle. The mobile platform may include a power module. The mobile platform may include a motor for movement of the mobile platform. The mobile platform may include one or more support accessories. The mobile platform may include one or more cartridges that may be placed on one or more platforms. A plurality of mobile platforms in various sizes may make a kit of mobile platforms.

The kit of mobile platforms functions to provide a user a plurality of multi-functional mobile platforms. The kit of mobile platforms may vary in size, shape, and components. For example, the kit of mobile platforms may include a small mobile platform, a medium mobile platform, a large mobile platform, or a combination thereof. The large mobile platform may include a plurality of platforms, compartments, recesses, receiving shapes, handles, power modules, or a combination thereof. Preferably, the large mobile platform is used as a primary storage device for tools, products, components, articles, or a combination. The medium mobile platform may include a plurality of platforms, compartments, recesses, receiving shapes, handles, power modules, seats, or a combination thereof. Preferably, the medium mobile platform is used as a primary work cart to allow a user to take a portion of the tools, products, components, articles, or a combination thereof necessary for a specific task from the large mobile platform and move them to a task site on the medium mobile. The small mobile platform may include a plurality of platforms, compartments, recesses, receiving shapes, handles, power modules, seats, or a combination thereof. Preferably, the small mobile platform is used as a movable work, cartridge dolly, or both.

The one or more platforms function to support and secure the items. The one or more platforms may function to prevent items, cartridges, or both from moving relative to the platform during movement of the mobile platform, when the items or cartridges are in an open or in-use position, or both. The one or more platforms may be positioned substantially parallel to the ground during movement. The one or more platforms may be a single platform that is connected directly to a plurality of wheels. The one or more platforms may be a single platform that is indirectly connected to a plurality of wheels. The one or more platforms may be a plurality of platforms. The platforms may be connected to each other and move in unison. For example, the platforms may move from a vertical position to a horizontal position for shipping or storage. Preferably, the one or more platforms may be connected by one or more vertical supports to create a multi-tiered platform. More preferably, when more than one platform is present the platforms are rigidly supported so that the platforms are free of movement relative to each other. The one or more platforms may include a bottom platform, a top platform, and one or more intermediate platforms (e.g., platforms located between the bottom platform and the top platform). The one or more platforms may be removably attached to the mobile platform. For example, one platform may be removably connected to one or more cartridges removably secured to another platform of the mobile platform. The one or more platforms may be structurally rigid to support the weight of the items. The one or more platforms may vary in dimensional size and shape. The one or more platforms may be round, oval, rectangular, trapezoidal, square, symmetrical, asymmetrical, oblong, or a combination thereof. The one or more platforms may be shaped to support one or more tools, articles, parts, or a combination thereof. For example, the one or more platforms may be magnetic to prevent movement of a plurality of fasteners (e.g., screws, bolts, nails) store on the one or more platforms. The one or more platforms may be shaped to support one or more electronic accessories (e.g., a tablet, cellular device, radio, computer, or a combination thereof). The one or more platforms may be sized so that the platforms fit through a standard doorway. The one or more platforms may include one or more compartments.

The one or more compartments may function to receive one or more tools, components, cartridges, accessories, maintenance items, or a combination thereof. The one or more compartments may be shaped to receive and secure the one or more cartridges during movement. The one or more compartments may be complementary in shape with the one or more cartridges. For example, the cartridge may be rectangular in shape, and the compartment may also be rectangular in shape to receive the cartridge. The compartments may be integrated on a top surface of the bottom platform, the top platform, one or more of the intermediate platforms, or a combination thereof. The compartments may include a plurality of protruding walls (e.g., walls that extend from a top surface such as a wall that is substantially perpendicular to the top surface) to receive the one or more cartridges. The compartment walls may be adjustable relative to the top surface of the one or more platforms to allow for re-sizing, so that the re-sized compartment is correctly dimensioned to securely receive the one or more cartridge sizes. For example, the one or more platforms may include a plurality of notches along the perimeter to receive and secure removably attached compartment walls in a plurality of locations (e.g., the user may secure the compartment walls in appropriate locations to create a complimentary shape relative to the items being secured in the one or more compartments). The one or more compartments may include one or more grooves to receive one or more attachments keys of the one or more cartridges, a seat, one or more platforms, or a combination thereof. For example, one or more attachment keys on an attachment surface of the platform may be received by the one or more grooves integrally formed with the protruding walls of the compartments. The walls of the compartments may be removably attached to the one or more platforms to allow for a plurality of compartment combinations on each platform. The compartments may include one or more cutouts to allow drainage and removal or debris, liquids, moisture, chemicals, or a combination thereof. The cutouts may be round, triangular, rectangular, ovular, or a combination thereof. The cutouts may be located in a bottom of the compartments, walls of the compartments, or both. The one or more compartments may be used with or include one or more recesses.

The one or more recesses may function to receive and secure one or more support accessories. The one or more recesses may function to secure the one or more support accessories without intruding on any tools, components, cartridges, maintenance items, or combination thereof, located within the one or more compartments. For example, the one or more recesses may separate the one or more support accessories from any items located within the one or more compartments to allow users unobstructed access to the items without moving the one or more support accessories. The one or more platforms may include one or more recesses to secure support accessories during movement. The one or more recesses may be outrigger receiving recesses to secure one or more outriggers of the one or more cartridges secured on the one or more platforms. The outrigger receiving recesses may secure the one or more outriggers while the cartridge is in an open position to substantially decrease movement or tipping. The one or more recesses may be supported by one or more vertical supports.

The vertical supports may function to connect the one or more platforms. The vertical supports may function to support one platform relative to another platform, the wheels, or both. The vertical supports may attach to a side of the one or more platforms. The side may be a peripheral edge of the platform. The vertical supports may attach to a top surface or a bottom surface of the one or more platforms. The vertical supports may be connected to one or more sides of a platform. The vertical supports may be connected to two or more sides of a platform. For example, the vertical support may be connected to a forward edge and a side edge of a platform or a rear edge and a side edge of a platform (i.e., the vertical support may be located at a corner of the platform). Preferably, the vertical supports connect a top surface of the bottom platform to a bottom surface of the top platform. The intermediate platforms may be connected in a similar manner between the bottom platform and the top platform. The vertical supports may be attached to the one or more platforms via one or more fasteners, one or more adhesives, or both. The one or more fasteners may be a screw, bolt, nail, staple, clip, rivet, weld, solder, braze, heat staking, or a combination thereof. The vertical supports may be directly molded to the one or more platforms. The vertical supports may be attached to the one or more platforms using an adhesive. The adhesive may be glue, epoxy, polymer adhesives, rubber adhesives, or a combination thereof. One or more power module tracks may be attached to one or more of the vertical supports. The vertical supports may be structurally rigid to maintain shape and support the weight of the one or more platforms and any items stored on the platforms. The vertical supports may be round, oval, rectangular, trapezoidal, square, or a combination thereof. The vertical supports may be made of a solid material or may be hollow. The vertical supports may include strengthening ribs or beads. Preferably, the vertical supports are made of an injection-molded plastic and include a plurality of strengthening ribs to enhance structural rigidity. The vertical supports may be hollow and filled with a structural adhesive or additive that increases the strength of the vertical supports while increasing the weight of the vertical supports minimally (i.e., about 40 percent increase in weight or less, 30 percent increase in weight or less, about 20 percent increase in weight or less, preferably about 10 percent increase in weight or less). For example, the vertical supports may be made of metal and the hollow space may be filled with a structural foam that rigidifies the vertical support. The vertical supports may connect the one or more platforms to create a multi-tiered platform, mobile by one or more wheels attached to a bottom surface of the bottom platform.

The one or more wheels may function to facilitate movement or transportation of the mobile platform from one location to a second location of interest. The one or more wheels may function to substantially reduce the friction created by movement of the mobile cart. The one or more wheels may preferably be a plurality of wheels. The one or more wheels may be directly or indirectly connected to the one or more platforms. The one or more wheels may be mounted to a peripheral edge of the one or more platforms. The one or more wheels may be mounted to a bottom surface of the one or more platforms. The one or more wheels may support the weight of the mobile platform and any items being supported by the mobile platform. The wheels may be fixed to only allow movement in a straight path. The wheels may be pivotally engaged (directly or indirectly) to the mobile platform to allow for free-range movement (i.e., movement of the mobile platform along a surface in any direction). The wheels may be casters or tires, or a combination thereof. The wheels may be solid or hollow, or a combination thereof. The wheels may be made from plastic, rubber, metal, wood, or a combination thereof. The wheels may include a bearing to further decrease friction during movement of the mobile platform. The wheels may vary in diameter. The wheels may be driven directly or indirectly by a motor mounted to the mobile platform.

The motor functions to drive rotation of the wheels to move the mobile platform. The motor may be sufficiently large to drive one wheel or more, two wheels or more, three wheels or more, preferably four wheels or more, more preferably five wheels or more, even more preferably six wheels or more. The motor may be powered by an external source (i.e., a wall outlet). The one or more motors may be powered by a power module located on the mobile platform. The motor may run from an alternative current source (AC). The motor may run from a direct current source (DC). The one or more motors may be free of a DC power source that powers the one or more motors (i.e., battery powered). The motor may be a brushless motor. The motor may be a DC brushless motor. The motor may include one or more gears. The motor may be free of gears. The motor may include a motor shaft, one or more bushings, a motor cover, a motor housing, one or more magnets, a motor rotor, a motor stator, one or more motor windings, or a combination thereof. The motor may be attached to a platform, vertical support, compartment, or a combination thereof. The motor may be located within a power module. Preferably, a plurality of motors may drive a plurality of zones of wheels of the mobile platform. For example, one motor is mounted to a platform and drives a first zone of wheels and a second motor is also mounted to the platform and drives a second zone of wheels. The wheels may be grouped into a single zone or a plurality of zones. The motor may aid a user moving the mobile platform from a first location to a desired location using a handle.

The handle may function to give the user an accessible receiving portion of the mobile platform to move the mobile platform. The handle may function to attach the mobile platform to a second mobile platform. The handle may be pivotally engaged to the mobile platform. The handle may be rigidly attached to the mobile platform. The handle may be secured to a side of the one or more platforms, or a side of the one or more vertical supports. The handle may be directly or indirectly attached to the mobile platform. For example, the handle may be directly molded to the one or more platforms, or indirectly attached using an intermediate attachment bracket. There may be a plurality of handles on the mobile platform. The plurality of handles may be directly or indirectly attached, or a combination thereof. The handle may be round, oval, rectangular, trapezoidal, square, symmetrical, asymmetrical, oblong, or a combination thereof. The handle may contain a grip end. The handle may contain a shaft.

The shaft may function to connect the grip end of the handle to the mobile platform. The shaft may function to extend the handle a determined distance off an attachment surface of the mobile platform. The shaft may function to pivotally engage the handle to the mobile platform. The shaft may be hollow or made of a solid material. The shaft may vary in length (i.e. less than about 1 foot in length, about 1 to 2 feet in length, more than about 4 feet in length, about 3 to 4 feet in length, or preferably 2 to 3 feet in length). The shaft may be round, oval, rectangular, trapezoidal, square, symmetrical, asymmetrical, oblong, or a combination thereof. The shaft may include a shaft end to attach the shaft to the mobile platform.

The shaft end may function to directly or indirectly attach the shaft to the mobile platform. The shaft end may rigidly or pivotally attach the shaft to the mobile platform. The shaft end may removably attach the shaft to the mobile platform. The shaft end may include one or more holes, recesses, cut-outs, or a combination thereof, to attach to the mobile platform. The shaft end may be attached using one or more fasteners. The one or more fasteners may be a screw, bolt, nail, staple, clip, rivet, weld, solder, braze, heat staking, or a combination thereof. The shaft end may be attached to the one or more platforms using an adhesive. The adhesive may be glue, epoxy, polymer adhesives, rubber adhesives, or a combination thereof. The shaft end may be attached to the mobile platform using an attachment bracket.

The attachment bracket functions to secure the handle to the mobile platform. The attachment bracket may connect to a grip end or a shaft end of the handle. Preferably, the attachment bracket connects to a shaft end of the handle. The attachment bracket may connect to the handle using one or more fasteners, adhesives, mechanical locking features, or a combination thereof. The one or more fasteners may be a rivet, bolt, screw, nail, staple, weld, solder, braze, heat staking, or a combination thereof. The adhesive may be glue, epoxy, polymer adhesives, rubber adhesives, or a combination thereof. The attachment bracket may connect to the handle using one more push pins that engage one or more receiving features of the handle. The attachment bracket may connect to the handle using a press-fit mechanism (i.e., a male portion mates to a female portion). For example, the attachment bracket may be a female portion adapted to receive a substantially similarly shaped male portion of the shaft end of the handle. The attachment bracket may connect to the handle using a mechanical locking feature with a shape that substantially mates with the shaft end of the handle. The mechanical locking feature may include one or more locks, one or more tracks, one or more snaps, one or more clips, or a combination thereof. For example, the shaft end of the handle may include a flange that is received by one or more spring-loaded clips of the attachment bracket to secure the shaft end against the one or more platforms, the one or more vertical supports, or both. Preferably, the shaft end of the handle is shaped to engage one or more protruding tracks of the attachment bracket and slide into the attachment bracket to abut the one or more platforms, one or more vertical supports, or both. The attachment bracket may protrude substantially perpendicular to a side of the one or more platforms, the one or more vertical supports, or both. The attachment bracket may protrude at an angle other than substantially perpendicular to the one or more platforms, the one or more vertical supports, or both. The attachment bracket may include a plurality of attachment components to make a shape adapted to receive a shaft end of the handle. For example, the attachment bracket may include a plurality of track components that, when secured together on the one or more platforms, on or more vertical supports, or both create a substantially rectangular protruded shape adapted to receive a substantially rectangular shape of the shaft end. A plurality of attachments brackets may be used to secure a handle. Conversely, a single attachment bracket may secure a plurality of handles to the one more platforms, one or more vertical supports, or both. When the shaft end is engaged in the attachment bracket, one or more locks prevent the shaft end from releasing from the attachment bracket. The one or more locks may be a latch, hook, hinge, magnet, snap, fastener, clip, tie, or a combination thereof. The one or more locks may allow for quick disengagement of the one or more locks to disconnect the handle from the attachment bracket. For example, the one or more locks may be a spring loaded clip that can be compressed on a first end to disengage a second end of the clip from a shaft end of the handle to allow a user to disconnect the handle from the attachment bracket. The attachment bracket may connect to one or more platforms, one or more vertical supports, or both using fasteners, adhesives, or a combination thereof. Preferably, the attachment bracket is integrally formed with one or more platforms. The attachment bracket may be made of a substantially similar material to that of the one or more platforms, the one or more vertical supports, or both. The attachment bracket may be made of a substantially different material. For example, the attachment bracket may be made of a metal such as stainless steel while the one or more platforms, one or more vertical supports, or both are made from an injection-molded polyamide material. Preferably, the attachment bracket may be adapted to receive the shaft end of the handle in a substantially square shaped track, locking the shaft end in place by one or more locks (e.g., clips, latches, hooks, snaps, fasteners, ties, or a combination thereof). More preferably, a user may remove the shaft end of the handle by releasing the one or more locks and sliding the shaft end out of the attachment bracket, disengaging the handle from the attachment bracket. The attachment bracket may pivotally engage the handle when attached to allow a user a range of angular motion of the handle. The attachment bracket may include one or more joints (e.g., a ball and socket joint, a pivot joint, a fixed joint, or a combination thereof), one or more hinges, one or more bearings (e.g., to allow the attachment bracket to rotate relative to a center point of the attachment bracket), or a combination thereof. The handle range of motion relative to the attachment bracket may be 30 degrees or more, 45 degrees or more, 90 degrees or more, 125 degrees or more, preferably 180 degrees or more, more preferably 210 degrees or more. The attachment bracket may lock the handle in place at a desired position within the range of motion. For example, a push pin may be received by respective holes in the attachment bracket, the handle, or both to lock the handle in the desired location. The shaft end that engages the attachment bracket may be at an opposing end of the shaft of the handle relative to the grip end.

The grip end may function to allow the user a receiving feature to manually grasp the handle. The grip end may function to attach the handle of one mobile platform to one or more additional mobile platforms. The grip end may be directly or indirectly attached to the shaft. The grip end may be hollow or made of a solid material. The grip end may be round, oval, rectangular, trapezoidal, square, symmetrical, asymmetrical, oblong, or a combination thereof. The grip end may include one or more holes, recesses, cut-outs, or a combination thereof, to attach to the mobile platform. The grip end may be attached using one or more fasteners. The one or more fasteners may be a screw, bolt, nail, staple, clip, rivet, weld, solder, braze, heat staking, or a combination thereof. The grip end may be attached to the mobile platform using an adhesive. The adhesive may be glue, epoxy, polymer adhesives, rubber adhesives, or a combination thereof. The grip end may be press fit to the shaft (i.e., a receiving portion of the shaft may be slightly smaller than a portion of the grip end to allow for interference between the grip end and the shaft once pressure is applied). The grip end may removably attach to a hitch of one or more additional mobile platforms.

The hitch of the mobile platform may function to receive and removably attach a component of one or more additional mobile platforms. The hitch may function to secure one or more additional mobile platforms to the mobile platform so the plurality of mobile platforms may be moved in unison. The hitch may be attached to the mobile platform directly or indirectly. The hitch may be attached to the one or more vertical supports. Preferably, the hitch may be attached to a side of the one or more platforms of the mobile platform.

The hitch may include a receiving feature to provide an interference fit with the handle. For example, the hitch may include compressible or expandable substantially parallel ends that secure that handle. The hitch may include one or more holes, recesses, cut-outs, or a combination thereof, to attach to the mobile platform. The hitch may be attached using one or more fasteners. The one or more fasteners may be a screw, bolt, nail, staple, clip, rivet, weld, solder, braze, heat staking, or a combination thereof. The hitch may be attached to the mobile platform using an adhesive. The adhesive may be glue, epoxy, polymer adhesives, rubber adhesives, or a combination thereof. The hitch may be round, oval, rectangular, trapezoidal, square, symmetrical, asymmetrical, oblong, or a combination thereof. The hitch may allow for attachment of one or more additional mobile platforms to accommodate movement of additional items or cartridges.

The one or more cartridges may function to store and secure items during movement. The one or more cartridges function to kit items together for the user's desired task. The one or more cartridges may allow the user to transport one or more tools, components, materials, maintenance items, or combination thereof, from a first location to the mobile platform. The one or more cartridges may allow the user to transport the one or more tools, components, materials, maintenance items, or a combination thereof, from the mobile platform to a second desired location. The one or more cartridges may be received on the one or more compartments of the mobile platform for secured movement. The one or more cartridges may be a bin, toolbox, tote, box, carton, package, basket, bucket, tub, case, container, or a combination thereof. The one or more cartridges may be created from metals, such as aluminum or steel, plastic, a polymer, an overmolded material, a composite, a natural material, a synthetic material, an alloy, or a combination thereof. The one or more cartridges may be made of metal the platform is iron, steel, aluminum, or a combination thereof. The steel may be AISI 1008 steel carbon steel, AISI 1010 steel, or high-strength low-alloy (HSLA) steel. Preferably, the one or more cartridges are made from plastic. The plastic may be polyamide nylon 6, polyamide nylon 66, polyamide 12, polycarbonate, PET thermoplastic polyester resin, or polystyrene. The one or more cartridges may be comprised of one material, or a plurality of materials. The materials may be injection-molded, stamped, or cast. The one or more cartridges may vary in dimensional size and shape. The one or more cartridges may be round, oval, rectangular, trapezoidal, square, symmetrical, asymmetrical, oblong, or a combination thereof. The one or more cartridges may vary in width. For example, the one or more cartridges may be less than about 4 inches in width, about 4 inches to 8 inches in width, about 8 inches to 11 inches in width, about 13 inches to 18 inches in width, about 18 inches to 22 inches in width, greater than about 22 inches in width, or preferably about 11 inches to 13 inches in width, or more preferably about 12 inches in width. The one or more cartridges may vary in length. For example, the one or more cartridges may be less than about 6 inches in length, about 6 inches to 12 inches in length, about 12 inches to 21 inches in length, about 23 inches to 31 inches in length, about 31 inches to 37 inches in length, or preferably about 21 inches to 23 inches in length, or more preferably about 22 inches in length. The one or more cartridges may vary in height. The one or more cartridges may be less than about 6 inches in height, about 6 inches to 11 inches in height, about 13 inches to 18 inches in height, greater than about 18 inches, or preferably about 11 inches to 13 inches in height, or more preferably about 12 inches in height. The one or more cartridges may include one or more handles. The one or more cartridges may include a full enclosure (i.e., a container with a lid for complete closure). The one or more cartridges may include an open container for unobstructed access to items within the one or more cartridges (i.e., a bin with no lid). The one or more cartridges may be collapsible. For example, the one or more cartridges may fold to substantially smaller dimensions when not in use. The one or more cartridges may be stackable. The one or more cartridges may be rigid to support the weight of the items or the weight of additional cartridges. The one or more cartridges may contain one or more outriggers to support the weight of the one or more cartridges when in an open position. The one or more cartridges may be stored in a gang box along with one or more mobile platforms while not in use. The one or more cartridges may secure power tools during movement to a job site where the power tools may be used with a power module.

The power module may function to provide power to items (i.e., tools or equipment) at a desired location. The power module functions to power items as a secondary power source not connected to a main power line. The power module may be attached to the one or more vertical supports of the mobile platform. Preferably, the power module may be attached to a side of the one or more platforms. More preferably, the power module may be attached to a bottom surface of a platform. A plurality of power modules may be mounted to a mobile platform. Preferably, a first power module is mounted to a bottom of a top platform or an intermediate platform, and a second power module is mounted to a bottom surface of a bottom platform. More preferably, the first power module allows a user to power one or more accessories while the second power module power one or more motors driving the wheels. The power module may be attached to the mobile platform directly or indirectly. The power module may be attached to the mobile platform via one or more fasteners, one or more adhesives, tracks, or a combination thereof. The one or more fasteners may be a screw, bolt, nail, staple, clip, rivet, weld, solder, braze, heat staking, or a combination thereof. The adhesive may be glue, epoxy, polymer adhesives, rubber adhesives, or a combination thereof. Preferably, the power module is removably attached to a plurality of tracks mounted to the mobile platform. The power module may slide across the plurality of tracks to allow a user to remove and insert the power module. The tracks may be secured to a platform, vertical support, or both. The tracks may be secured by fasteners, adhesives, or both. The tracks may be made of a similar material to the mobile platform or different. For example, the mobile platform may be substantially made of polymeric materials while the tracks are made substantially of metal. The power module may be directly molded to the one or more platforms. The mobile platform may contain a plurality of power modules. The power module may include a rechargeable battery. The power module may contain a voltmeter, voltmeter display, inverter, power outlets, or a combination thereof. A housing of the power module may be attached to the mobile platform.

The housing may function to enclose one or more components of the power module. The housing functions to protect the internal components of the power module from outside elements (i.e., water, chemicals, debris, dust, or a combination thereof). The housing may be created from metals, such as aluminum or steel, plastic, a polymer, an overmolded material, a composite, a natural material, a synthetic material, an alloy, or a combination thereof. Preferably, when the housing is made of metal the platform is iron, steel, aluminum, or a combination thereof. The steel may be AISI 1008 steel carbon steel, AISI 1010 steel, or high-strength low-alloy (HSLA) steel. The power module may be made from plastic. The plastic may be polyamide nylon 6, polyamide nylon 66, polyamide 12, polycarbonate, PET thermoplastic polyester resin, or polystyrene. The power module may be comprised of one material, or a plurality of materials. The materials may be injection-molded, stamped, or cast. The housing may contain a rechargeable battery.

The rechargeable battery may function to provide a power source for the power module. The rechargeable battery functions to provide power remotely disconnected from a main power source (i.e. a wall socket). The rechargeable battery may be charged a plurality of times by a main power source. The rechargeable battery may be a flow battery, fuel cell, lead-acid battery, lithium-ion battery, lithium air battery, magnesium-ion battery, molten salt battery, nickel-cadmium battery, nickel hydrogen battery, nickel-iron battery, organic radical battery, polymer-based battery, potassium-ion battery, alkaline battery, sodium-sulfur battery, or a combination thereof. The rechargeable battery may be attached to a voltmeter.

The voltmeter may function to measure the electrical potential in the power module. The voltmeter may be secured in the housing and connected directly or indirectly to the rechargeable battery. The voltmeter may be analog, or more preferably, digital. The voltmeter may be connected to a voltmeter display.

The voltmeter display may function to give the user a visible voltage reading. The voltmeter display may be attached to an outer side of the housing of the power module. The voltmeter display may be integrated into the housing (i.e., pressed directly into a cutout of the housing). The voltmeter display may be directly or indirectly connected to the voltmeter. The voltmeter display may give the user a voltage readout when one or more items are connected to the power module via one or more power outlets.

The one or more power outlets may function to connect one or more items (i.e., tools or equipment) to the power module. The one or more power outlets are connected directly or indirectly to the rechargeable battery of the power module. The one or more power outlets may be a plurality of power outlets. The one or more power outlets may be adapted to receive one or more plugs connected to a power accessory to power the power accessory. The power accessory may be a power tool such as a drill, saw, nail gun, grinding wheel, oscillating tool, hammer, or a combination thereof. The power accessory may be an accessory other than a power tool, such as an air compressor, electronic device (e.g., a cellular phone, computer, radio, tablet, or a combination thereof), vacuum, fan, motor, light, or a combination thereof. The one or more plugs may be a two-prong plug, a three-prong plug, a Universal Serial Bus plug (USB), micro USB, power lighter plug, or a combination thereof. The one or more power outlets may power a plurality of power accessories simultaneously. For example, the one or more power outlets may power a power tool and a plurality of electronic devices simultaneously. The one or more power outlets may be attached to the housing of the power module. Preferably, the one or more power outlets may be attached directly to an outside surface of the housing. For example, the housing may include one or more cutouts to receive the one or more power outlets. The one or more power outlets may each include a removable cap to protect the one or more power outlets from debris, liquid, moisture, chemicals, or a combination thereof. The removable cap may cover the power outlet using a press fit shape, threading, clips, mechanical keying features, fasteners, or a combination thereof. The one or more power outlets may be directly or indirectly attached to an inverter.

The inverter may function to change a direct power current to an alternating current. The inverter functions to allow the user to connect an item requiring a substantially higher amount of power to function. The inverter may convert the voltage output of the rechargeable battery to various different voltages. Preferably, the inverter may convert a 12-Volt output to a 120-Volt output. The inverter may be secured within the housing of the power module. The inverter may be directly or indirectly connected to the rechargeable battery. The inverter may be used to power one or more support accessories.

The one or more support accessories function to aid the user in one or more desired tasks. The one or more support accessories may be securely connected to the mobile platform by one or more recesses. The one or more support accessories may be connected to one or more peripheral edges of the one or more compartments. The one or more support accessories may be connected to the one or more platforms. The one or more support accessories may provide users unobstructed access to utilize equipment secured to the mobile platform. The one or more support accessories may include a light fixture (i.e., a light connected to an attachment shaft secured in the recess of the mobile platform). The support accessory may be one or more holding devices to secure an item during use. For example, a pipe may be placed in one or more holding devices connected to the mobile platform for the user to secure the pipe while cutting it. The one or more support accessories may be a removable vertical support. The one or more support accessories may be a rack to hang one or more items. For example, the rack may hold a coil of wire while performing electrical work at a desired location. The one or more support accessories may be a fan. The one or more support accessories may be one or more attachment mechanisms.

The one or more attachment mechanisms function to secure one or more items to the mobile platform. For example, the one or more attachment mechanisms may hold a larger item (such as a dolly) that may not securely fit on the one or more platforms. The one or more attachment mechanisms may be attached to the one or more vertical supports. The one or more attachment mechanisms may be attached to the one or more platforms. The one or more attachment mechanisms may be attached to the mobile platform via one or more fasteners, one or more adhesives, or both. The one or more fasteners may be a screw, bolt, nail, staple, clip, rivet, weld, solder, braze, heat staking, or a combination thereof. The adhesive may be glue, epoxy, polymer adhesives, rubber adhesives, or a combination thereof. Preferably, the one or more attachment mechanisms are attached to a combination of the one or more vertical supports and the one or more platforms via one or more fasteners. The one or more attachment mechanisms may include one or more attachments. For example, the one or more attachment mechanisms may include an upper attachment mounted to a side of one or more vertical platforms, and a lower attachment mounted to a side of the one or more platforms. The one or more attachment mechanisms may vary in dimensional size and shape. The one or more attachment mechanisms may be round, oval, rectangular, trapezoidal, square, symmetrical, asymmetrical, oblong, or a combination thereof. The one or more attachment mechanisms may secure a seat while not in use.

The seat functions to provide the user a comfortable and secure means to sit on the mobile platform. The seat may be removably attached to the mobile platform. The seat may be interchangeable between a plurality of mobile platforms. The seat may attach to the one or more platforms. The seat may attach to the one or more vertical supports. Preferably, the seat may attach to a top surface of the one or more platforms. The seat may include a pad. The seat may include an attachment surface. The seat may be comprised of a variety of materials. The seat may be created from metals, such as aluminum or steel, plastic, a polymer, an overmolded material, a composite, a natural material, a synthetic material, an alloy, or a combination thereof. Preferably, when the seat is made of metal the platform is iron, steel, aluminum, or a combination thereof. The steel may be AISI 1008 steel carbon steel, AISI 1010 steel, or high-strength low-alloy (HSLA) steel. The seat may be made from plastic. The plastic may be polyamide nylon 6, polyamide nylon 66, polyamide 12, polycarbonate, PET thermoplastic polyester resin, or polystyrene. The seat may be comprised of one material, or a plurality of materials. The materials may be injection-molded, stamped, or cast. The seat may have different components that are each made of different material. The seat may be attached to the mobile platform via one or more fasteners, one or more non-permanently binding adhesives, or both. The one or more fasteners may be a screw, bolt, clip, or a combination thereof. The adhesive may be glue, epoxy, polymer adhesives, rubber adhesives, or a combination thereof. Preferably, the seat may be attached using one or more attachment hooks located on an attachment surface of the seat.

The attachment surface functions to contact and secure the seat to the mobile platform. The attachment surface may be an opposite surface relative to the pad. The attachment surface may include one or more attachment hooks, one or more attachment keys, or both.

The one or more attachment keys function secure the seat to the mobile platform. The one or more attachment keys may be receiving by one or more grooves on a surface of the mobile platform. Preferably, a plurality of attachment keys are received by a plurality of grooves integrally formed in the ways of one or more compartments on a platform of the mobile platform adapted to receive the seat. The one or more attachment keys may vary in dimensional size and shape. The one or more attachment keys may be round, oval, rectangular, trapezoidal, square, symmetrical, asymmetrical, oblong, or a combination thereof. The one or more attachment keys may be used in conjunction with one or more attachment hooks.

The one or more attachment hooks function to secure the seat to the mobile platform. The one or more attachment hooks may attach to one or more cutouts on a surface of the mobile platform. The one or more attachment hooks may vary in dimensional size and shape. The one or more attachment hooks may be round, oval, rectangular, trapezoidal, square, symmetrical, asymmetrical, oblong, or a combination thereof. The one or more attachment hooks may be on an attachment surface opposite of the pad.

The pad may function to provide a substantially softer seating surface for the user relative to the mobile platform. The pad may be made of a softer material relative to the mobile platform. For example, the pad may be made of a compressible foam while the mobile platform is made of a substantially more rigid plastic material. The pad may be attached to the seat via one or more fasteners, one or more adhesives, or both. The one or more fasteners may be a screw, bolt, nail, staple, clip, rivet, or a combination thereof. The adhesive may be glue, epoxy, polymer adhesives, rubber adhesives, or a combination thereof. The seat may be round, oval, rectangular, trapezoidal, square, or a combination thereof.

FIG. 1A illustrates a perspective view of a mobile platform 2. The mobile platform 2 is a large mobile platform 100. The large mobile platform 100 includes three platforms 20. A plurality of wheels 10 are connected to a bottom surface of a bottom platform 26. The bottom platform 26 is connected to an intermediate platform 24 and a top platform 22 by vertical supports 12. The top platform 22 contains compartments 4 across a top surface of the top platform 22, along with two handles 50. A cartridge 400 shown as a toolbox 440 is secured in a receiving shape 8 of the top platform 22. The toolbox 440 includes outriggers (not shown) that secure in outrigger receiving recesses 32 located on the top platform 22 to stop movement of the toolbox 440 when in use. A support accessory 600 shown as a light fixture 610 is secured in a recess 16 by an attachment shaft 612 connected to a light 614 of the light fixture 610. A second support accessory 600 shown as a rack 660 is secured to the top platform 22 by the recesses 16.

FIG. 1B illustrates a close-up view of a mobile platform 2, shown as a large mobile platform 100 with a platform 20. A cartridge 400 shown as a toolbox 440 includes outriggers 442 secured in outrigger receiving recesses 32 on a top surface of a top platform 22 to eliminate unwanted movement of the toolbox 440 when in use. A hitch 30 is mounted to a side of the mobile platform 2.

FIG. 1C illustrates a different perspective view of a mobile platform 2, shown as a large mobile platform 100. The mobile platform 2 comprises three platforms 20. A plurality of wheels 10 are connected to a bottom surface of a bottom platform 26. The bottom platform 26 is connected to an intermediate platform 24 and a top platform 22 by vertical supports 12. A top surface of the bottom platform 26 includes receiving shapes 8 for cartridges 400, shown as bins 420. An attachment mechanism 34 is mounted to a side of the mobile platform 2. The attachment mechanism 34 includes an upper attachment 36 mounted to an end of the top platform 22, and a lower attachment 38 secured to the vertical supports 12 connecting the bottom platform 26 and the top platform 22.

FIG. 2A illustrates a perspective view of two mobile platforms 2, including a large mobile platform 100 and a medium mobile platform 200. A grip end 52 of a handle 50 of the medium mobile platform 200 is removably attached to a hitch 30 of the large mobile platform 100 to accommodate movement of the large mobile platform 100 and the medium mobile platform 200 in unison. The grip end 52 is located at an opposite end of a shaft 54 from a shaft end 56. The shaft end 56 is connected to the medium mobile platform 200 by an attachment bracket 58.

Figure 3A:
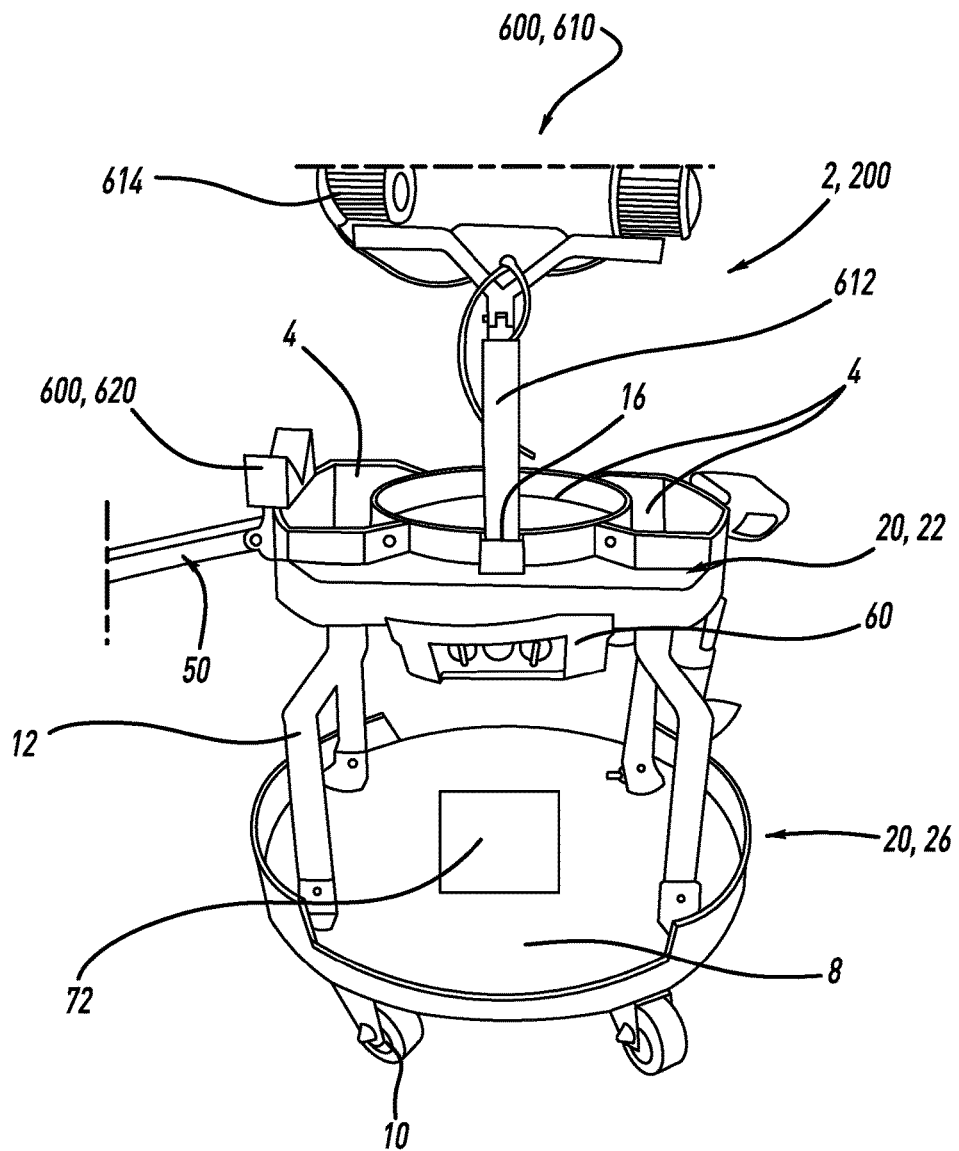
FIG. 3A illustrates a perspective view of a mobile platform.

FIG. 3A illustrates a perspective view of a mobile platform 2, shown as a medium mobile platform 200. The mobile platform 2 comprises two platforms 20. A plurality of wheels 10 are connected to a bottom surface of a bottom platform 26. The bottom platform 26 is connected to a top platform 22 by vertical supports 12. The bottom platform 26 comprises a receiving shape 8 within the bottom platform 26 for securing a cartridge (not shown). A motor 72 is mounted to the platform 20 to ease movement of the mobile platform 2. The top platform 22 comprises compartments 4 on a top surface, and a power module 60 mounted to a bottom surface. A support accessory 600, shown as a light fixture 610, includes a light 614 pivotally engaged to an attachment shaft 612. The attachment shaft 612 is secured in a recess 16 in the top platform 22. A second support accessory 600, shown as a first holding device 620, is mounted to the top surface of the top platform 22. A handle 50 is fixed to a side of the mobile platform 2.

Figure 3B:
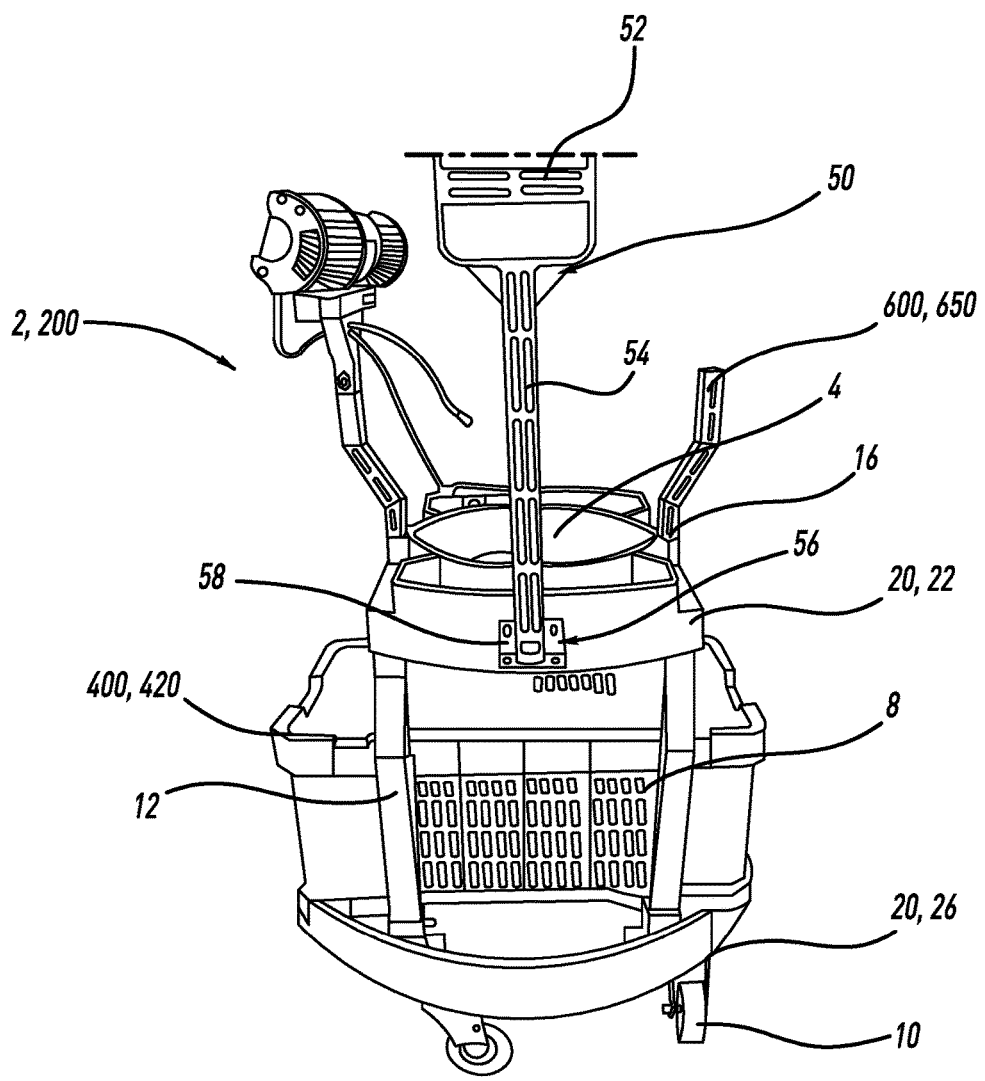
FIG. 3B illustrates a perspective view of a mobile platform.

FIG. 3B illustrates a perspective view of a mobile platform 2, shown as a medium mobile platform 200. The mobile platform 2 includes two platforms 20. A plurality of wheels 10 is mounted to a bottom surface of a bottom platform 26. The bottom platform 26 is connected to a top platform 22 by vertical supports 12. The top platform 22 has compartments 4 on a top surface. A support accessory 600, shown as a removable vertical support 650, is secured in a recess 16 of the top platform 22. A handle 50 is mounted to a side of the top platform 22. The handle 50 comprises a grip end 52 attached to a shaft 54. A shaft end 56 on an opposite end of the shaft 54 from the grip end 52 is secured to an attachment bracket 58 mounted to a side of the top platform 22. A cartridge 400, shown as a bin 420, is secured in a receiving shape 8 of the bottom platform 26.

Figure 4A:
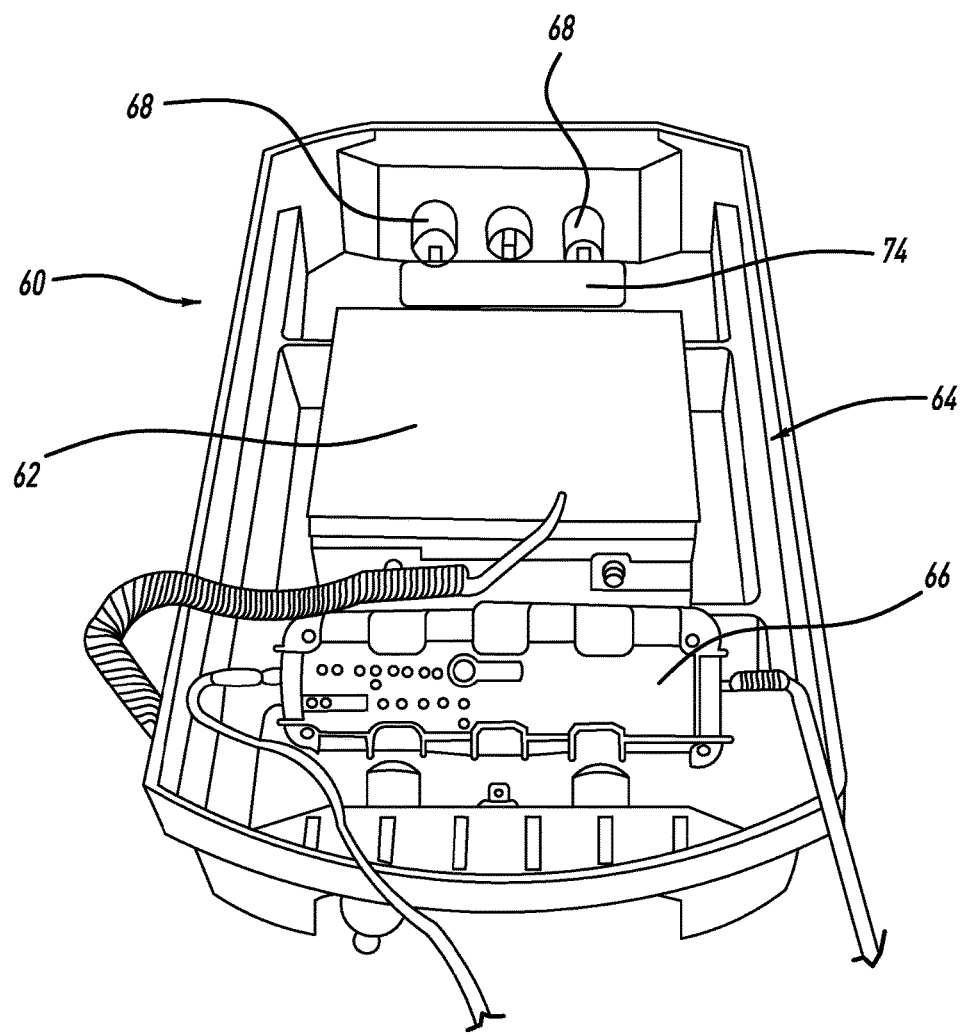
FIG. 4A illustrates an internal view of a power module.

FIG. 4A illustrates an internal view of a power module 60. A rechargeable battery 62 is enclosed within a housing 64. A voltmeter 66 is wired to the rechargeable battery 62. The voltmeter 66 is connected to a voltmeter display (not shown) fastened to a side of the housing to display a voltage output. An inverter 74 is wired to the rechargeable battery 62 to adjust the voltage output of the rechargeable battery 62. A plurality of power outlets 68 are fastened to sides of the housing 64 and connected to the rechargeable battery 62.

Figure 4B:
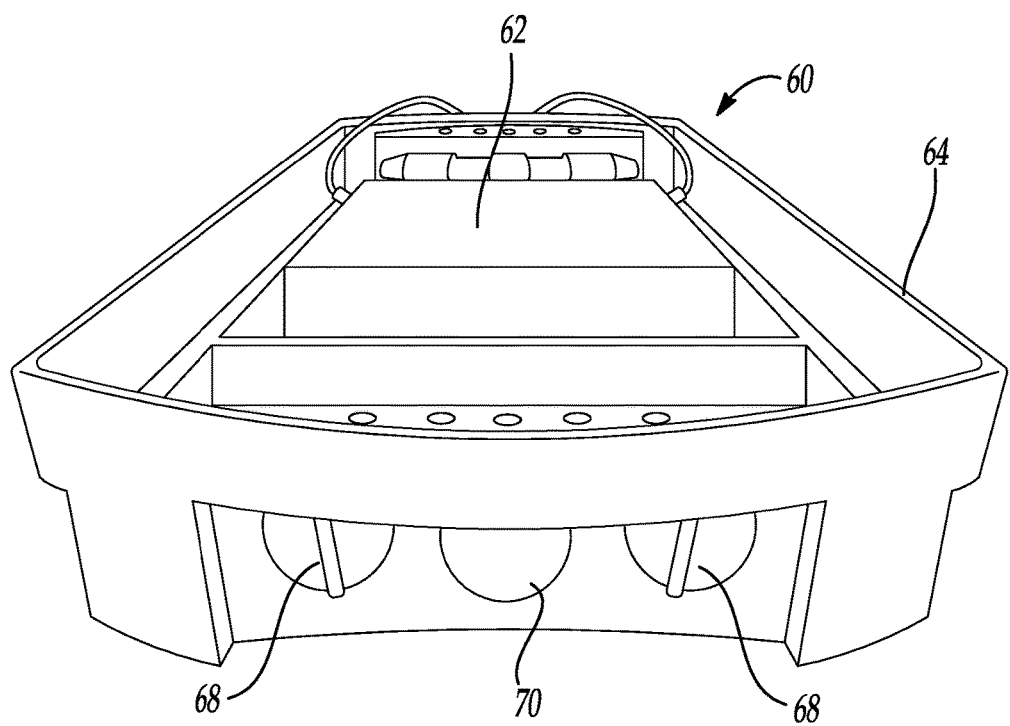
FIG. 4B illustrates a side view of a power module.

FIG. 4B illustrates a side view of a power module 60. A rechargeable battery 62 is enclosed within a housing 64. A plurality of power outlets 68 are secured to a side of the housing 64. A voltmeter display 70 is secured to a side of the housing 64 and connected to a voltmeter 66 (not shown) to give users a voltage readout.

Figure 5A:
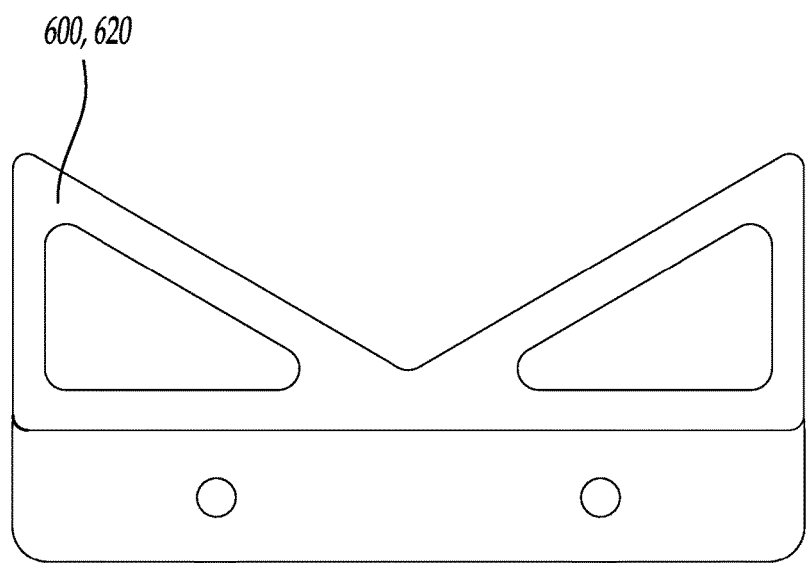
FIG. 5A illustrates a perspective view of a support accessory.

FIG. 5A illustrates a perspective view of a support accessory 600, shown as a first holding device 620.

Figure 5B:
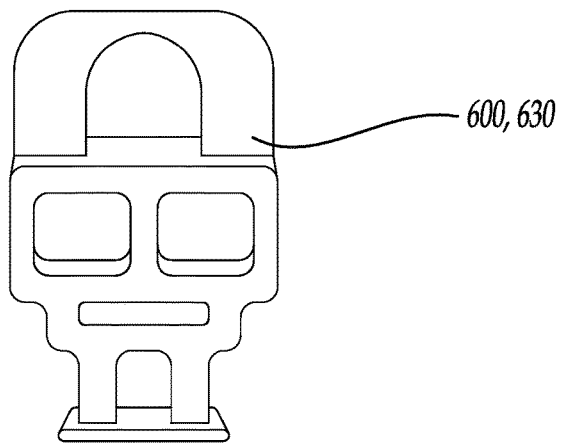
FIG. 5B illustrates a perspective view of a support accessory.

FIG. 5B illustrates a perspective view of a support accessory 600, shown as a second holding device 630.

Figure 6A:
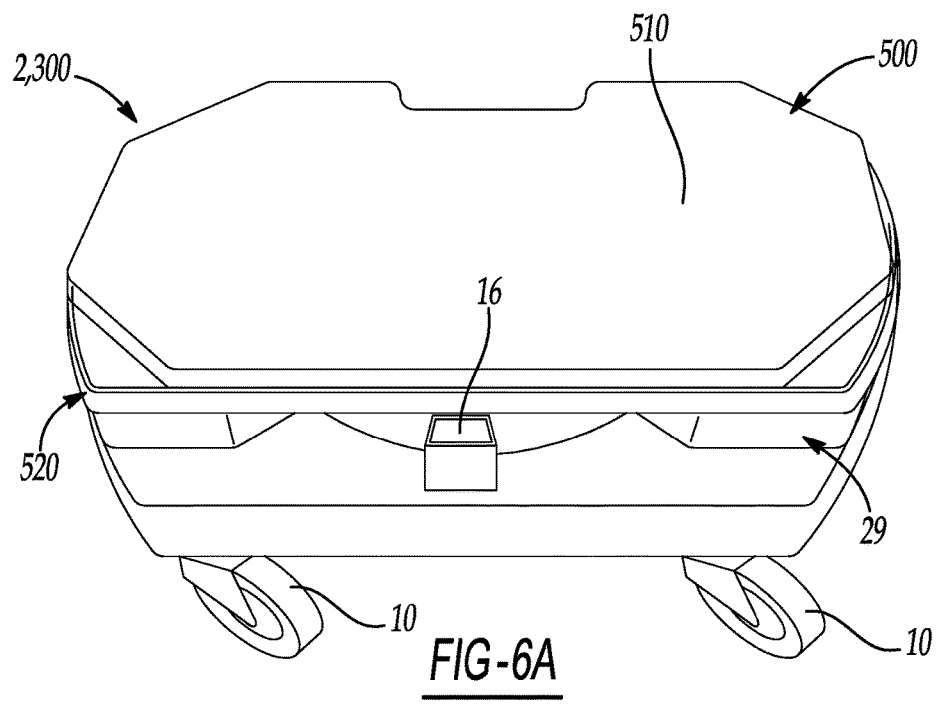
FIG. 6A illustrates a perspective view of a mobile platform.

FIG. 6A illustrates a perspective view of a mobile platform 2, shown as a small mobile platform 300. The mobile platform 2 has a single platform 20. A plurality of wheels 10 are attached to a bottom surface of the platform 20. A top surface of the platform 20 includes a recess 16 to receive a support accessory (not shown). A seat 500 is secured to the top surface of the platform 20 using one or more attachment hooks, attachment keys, or both (not shown) connected to an attachment surface 520 of the seat 500. The seat 500 has a pad 510 on a top surface to cushion a user while seated.

Figure 6B:
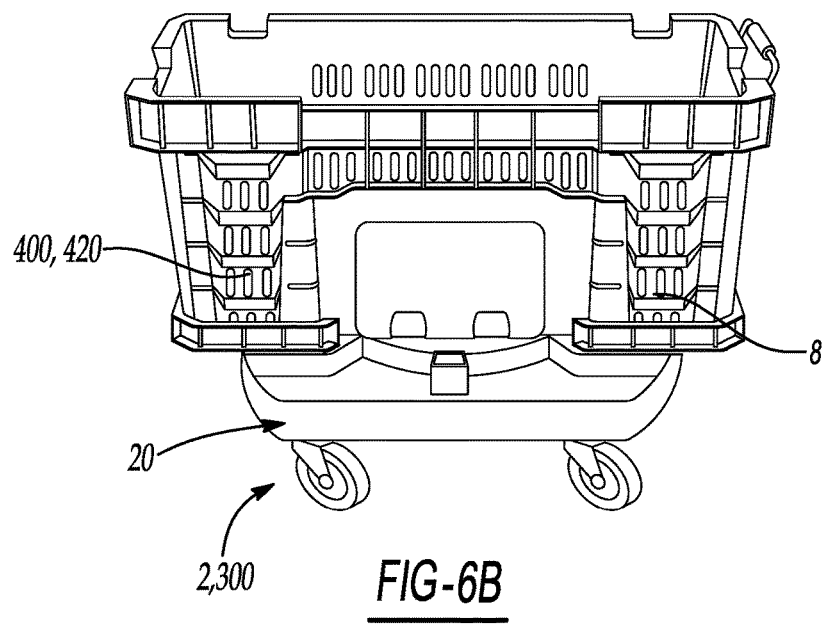
FIG. 6B illustrates a perspective view of a mobile platform.

FIG. 6B illustrates a perspective view of a mobile platform 2, shown as a small mobile platform 300. The mobile platform 2 has a single platform 20. A cartridge 400, shown as a bin 420, is secured in a receiving shape 8 within the platform 20.

Figure 6C:
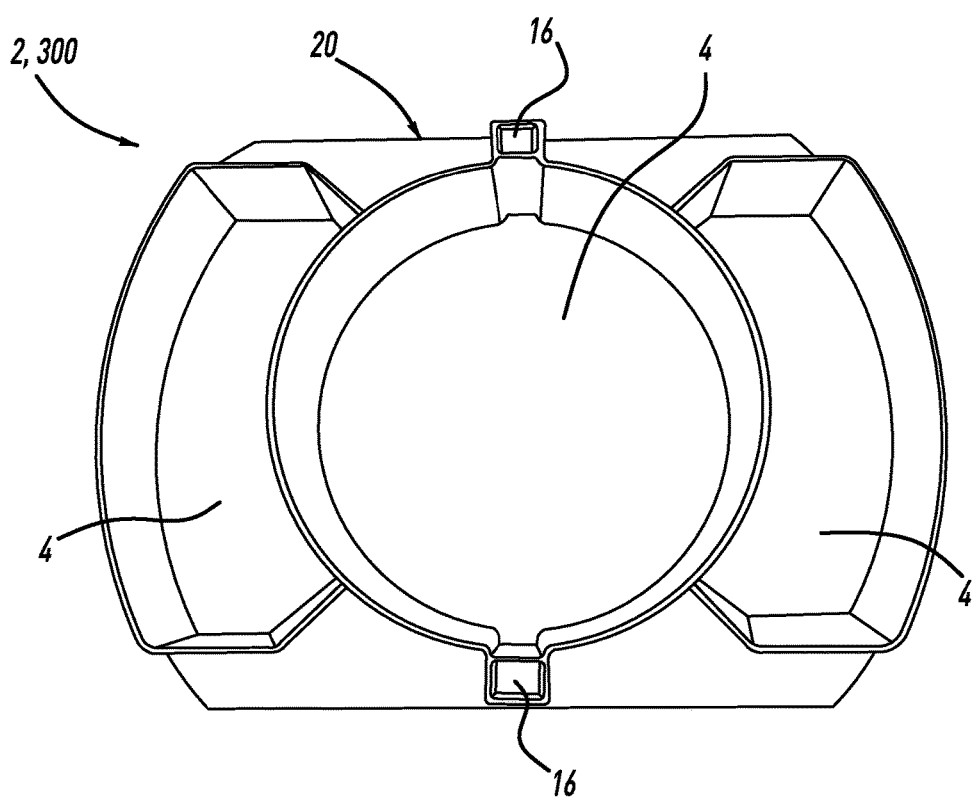
FIG. 6C illustrates a top-down view of a mobile platform.

FIG. 6C illustrates a top-down view of a mobile platform 2, shown as a small mobile platform 300. A top surface of a platform 20 includes recesses 16 to secure support accessories 600 (not shown), and compartments 4.

Figure 7:
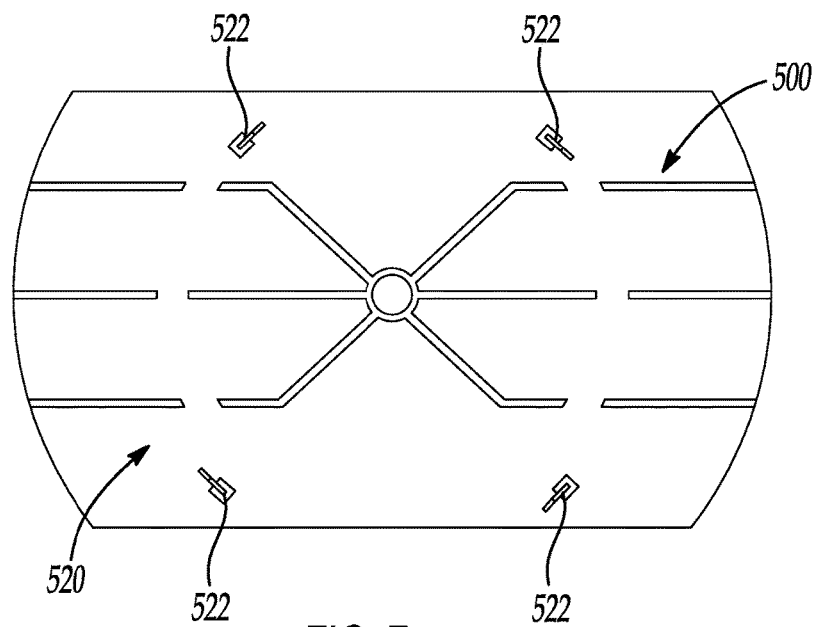
FIG. 7 illustrates a perspective view of an attachment surface of a seat.

FIG. 7 illustrates a perspective view of an attachment surface 520 of a seat 500. A plurality of attachment hooks 522 used to secure the seat 500 on a mobile platform (not shown) extend perpendicularly from the attachment surface 520.

Figure 8:
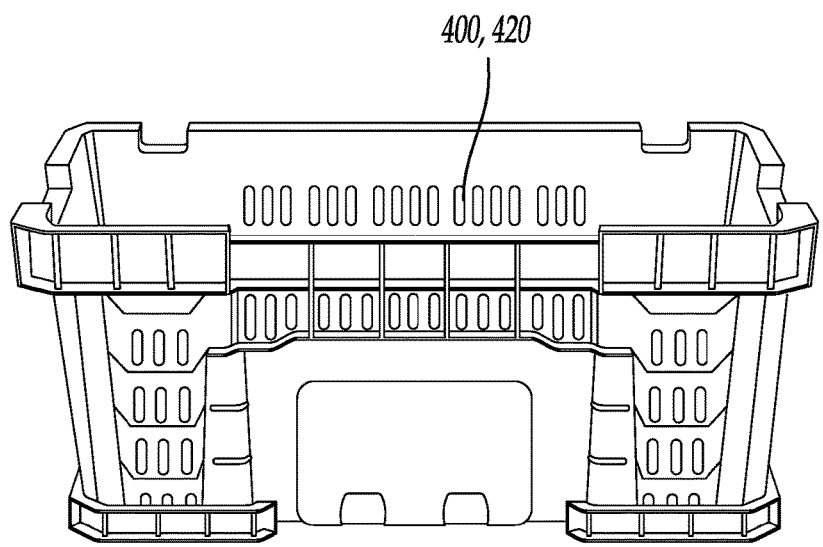
FIG. 8 illustrates a perspective view of a cartridge.

FIG. 8 illustrates a perspective view of a cartridge 400, shown as a bin 420.

Figure 9:
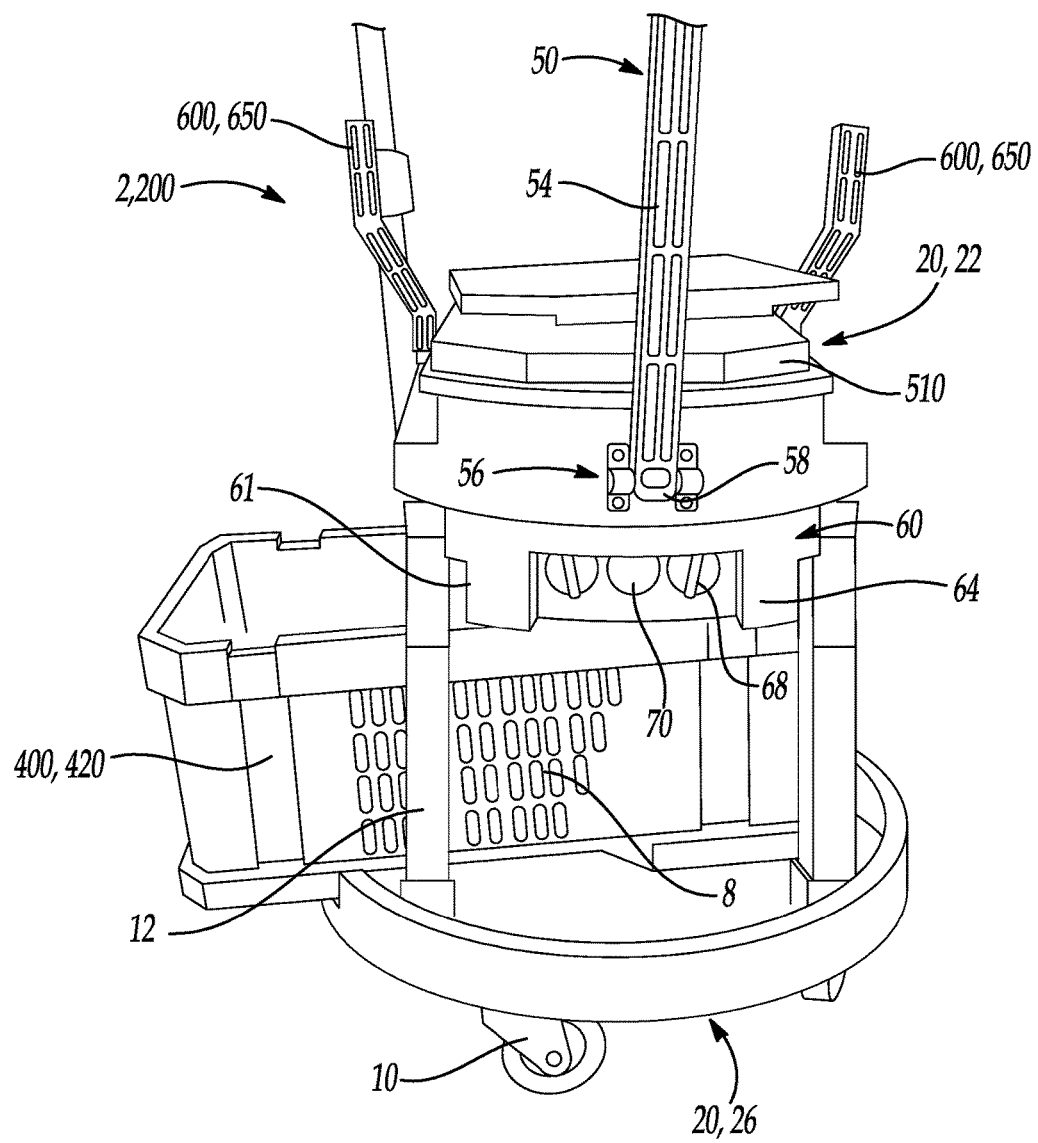
FIG. 9 illustrates a perspective view of a mobile platform.

FIG. 9 illustrates a perspective view of a mobile platform 2 shown as a medium mobile platform 200. The mobile platform 2 includes two platforms 20. A plurality of wheels 10 are mounted to a bottom surface of a bottom platform 26. The bottom platform 26 is connected to a top platform 22 by vertical supports 12. A power module 60 is secured to the top platform 22 by two power module tracks 61 mounted to the vertical supports 12. The power module 60 includes a housing 64 that includes a plurality of power outlets 68 and a voltmeter display 70 for a voltmeter (not shown) located within the housing 64. A handle 50 is mounted to a side of the top platform 22. The handle 50 includes a shaft 54 with a shaft end 56 pivotally engaged to an attachment bracket 58 mounted to the side of the top platform 22. A cartridge 400, shown as a bin 420, is secured in a receiving shape 8 of the bottom platform 26. A pad 510 is secured to a top surface of the top platform 22. A plurality of support accessories 600 shown as removable vertical supports 650 are secured in recesses (not shown) of the top platform 22.

Figure 10:
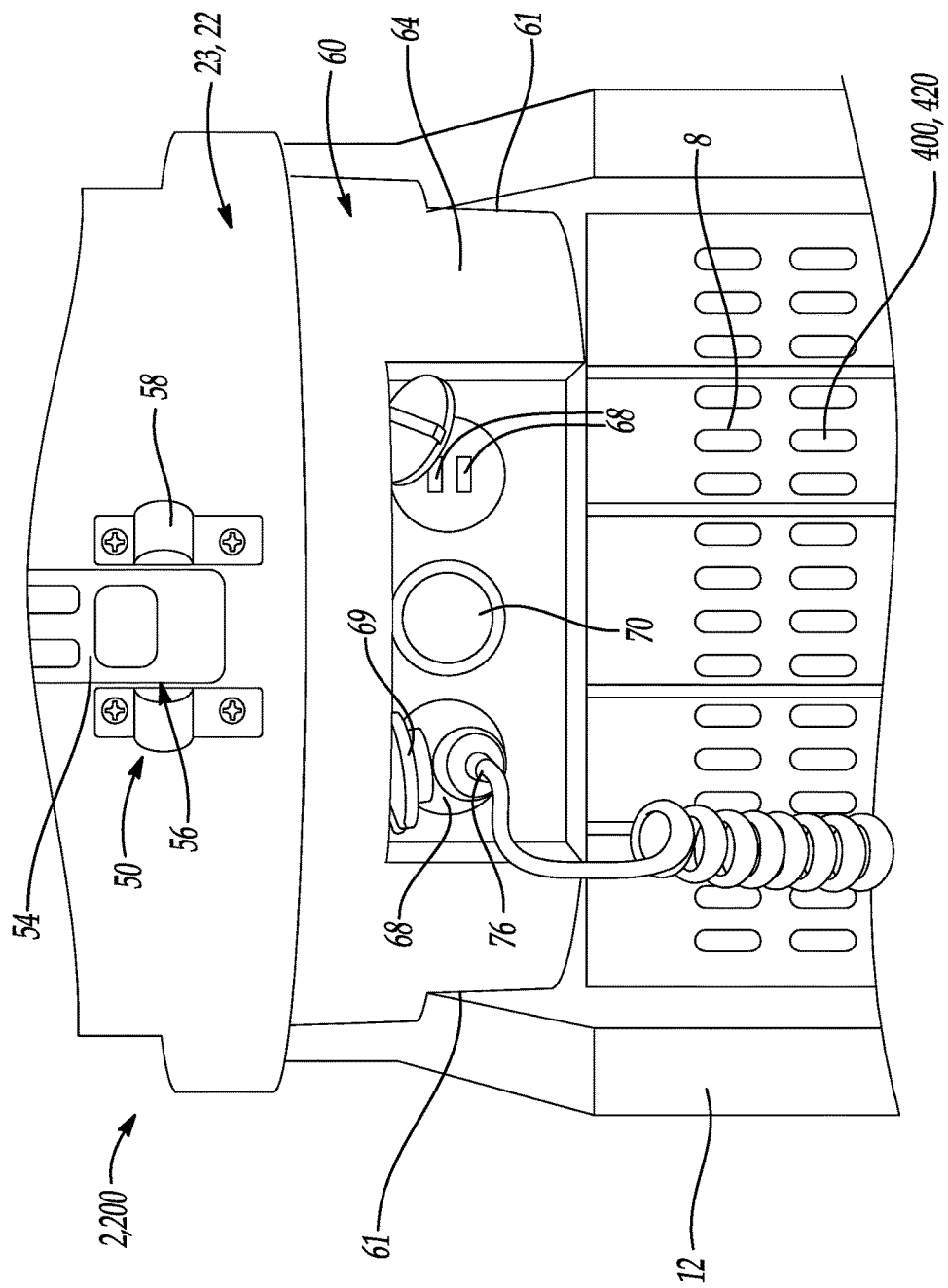
FIG. 10 illustrates a close-up view of a power module mounted to a mobile platform.

FIG. 10 illustrates a close-up view of a power module 60 mounted to a mobile platform 2 shown as a medium mobile platform 200. The power module 60 is located beneath a platform 20 that is a top platform 22 and secured by two power module tracks 61 mounted to one or more vertical supports 12. The power module includes a housing 64 with a plurality of power outlets 68 that receive one or more plugs 76. A voltmeter display 70 is also secured to the housing 64 for a voltmeter (not shown) located within the housing 64. The plurality of power outlets 68 each includes a power outlet cap 69 to protect each power outlet 68 when not in use. A handle 50 is mounted to a side of the top platform 22. The handle 50 includes a shaft 54 with a shaft end 56 pivotally engaged to an attachment bracket 58 mounted to the side of the top platform 22. A cartridge 400, shown as a bin 420, is secured in a receiving shape 8 of the bottom platform (not shown) beneath the power module 60.

Figure 11:
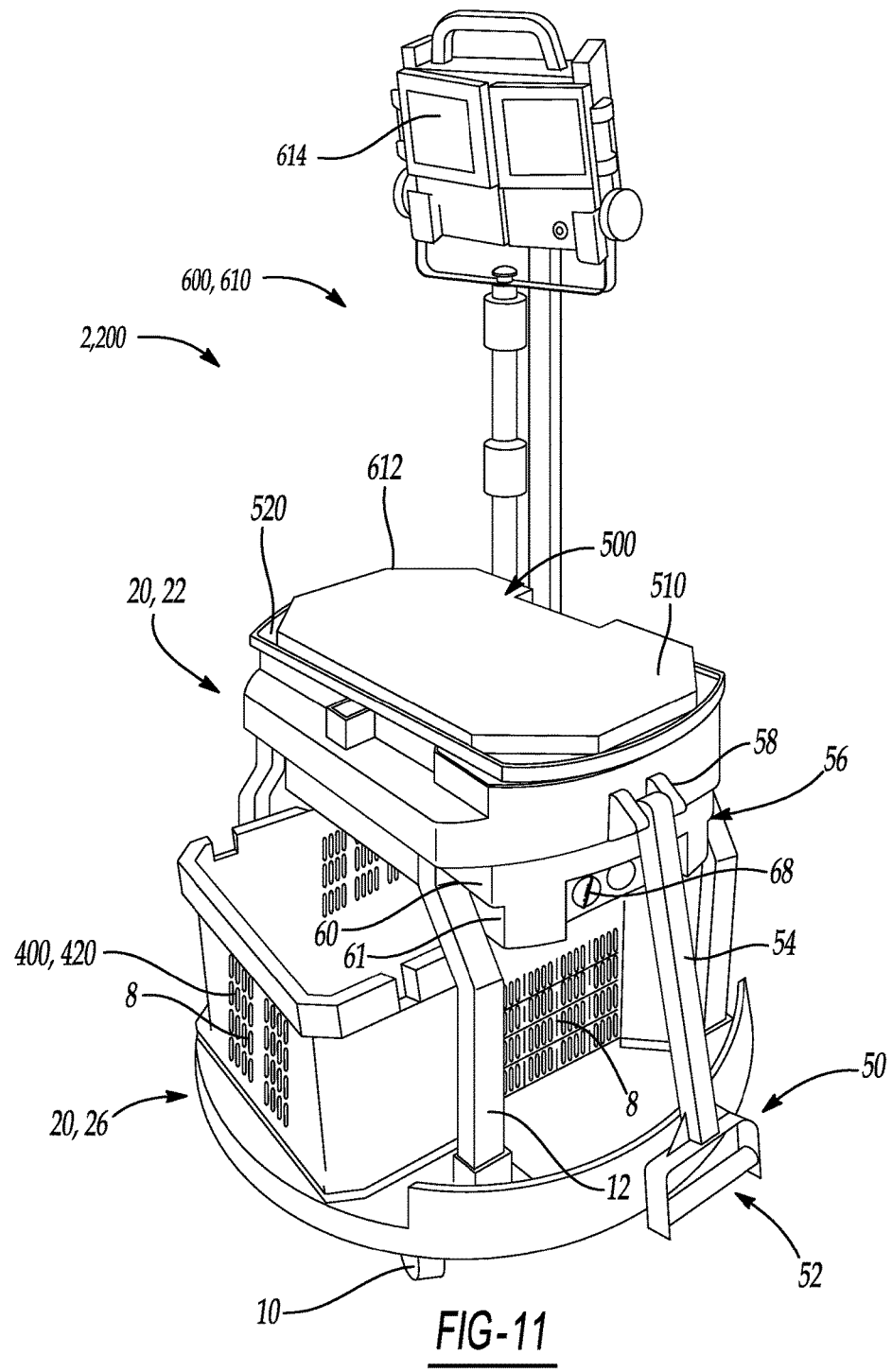
FIG. 11 illustrates a perspective view of a mobile platform.

FIG. 11 illustrates a perspective view of a mobile platform 2 shown as a medium mobile platform 200. The mobile platform 2 includes two platforms 20. A plurality of wheels 10 are mounted to a bottom surface of a bottom platform 26. The bottom platform 26 is connected to a top platform 22 by vertical supports 12. A power module 60 is secured to the top platform 22 by two power module tracks 61 mounted to the vertical supports 12. The power module 60 includes a plurality of power outlets 68 to receive one or more plugs (not shown). A handle 50 is mounted to a side of the top platform 22. The handle 50 includes a shaft 54 with a shaft end 56 pivotally engaged to an attachment bracket 58 mounted to the side of the top platform 22. The handle 50 also includes a grip end 52 for a user to grip the handle 50. A cartridge 400, shown as a bin 420, is secured in a receiving shape 8 of the bottom platform 26. An attachment surface 520 of a seat 500 is secured to a top surface of the top platform 22 by one or more attachment hooks, attachment keys, or both (not shown). The seat 500 includes a pad 510 for a user to sit or kneel on. A support accessory 600 shown as light fixture 610 is secured in a recess (not shown) of the top platform 22 by one end of an attachment shaft 612, and includes a light 614 secured to an opposite end of the attachment shaft 612.

Figure 12:
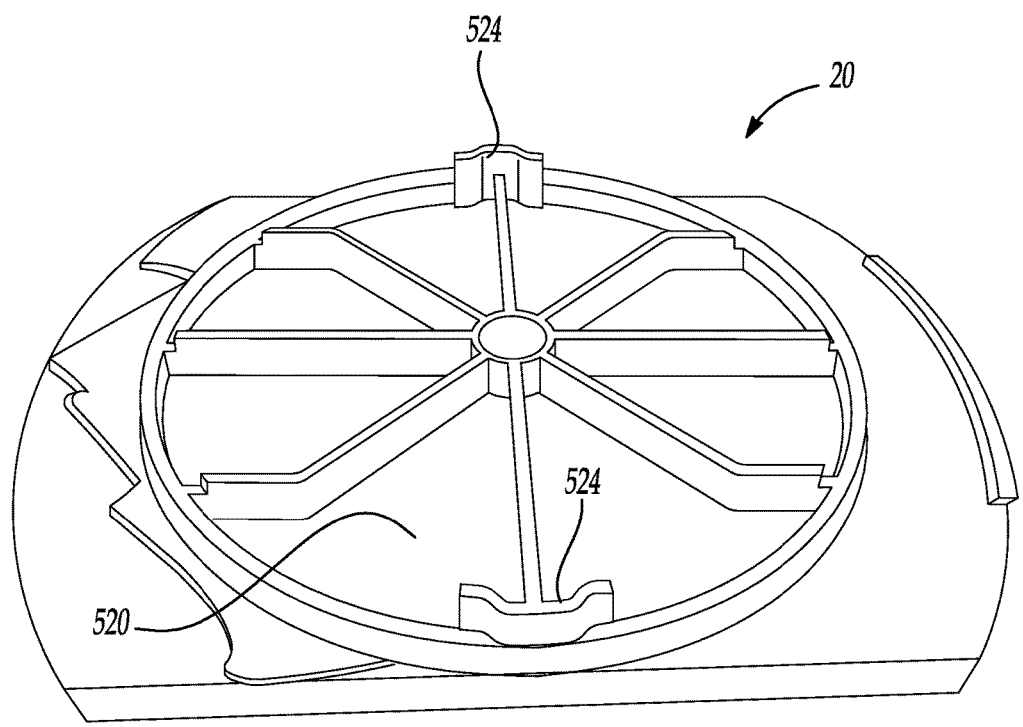
FIG. 12 illustrates a perspective view of an attachment surface of a seat.

FIG. 12 illustrates a perspective view of an attachment surface 520 of a platform 20. The platform 20 includes one or more attachment keys 524 protruding from the attachment surface 520 to secure the platform 20 to a mobile platform, a cartridge, or both (not shown).

Figure 13:
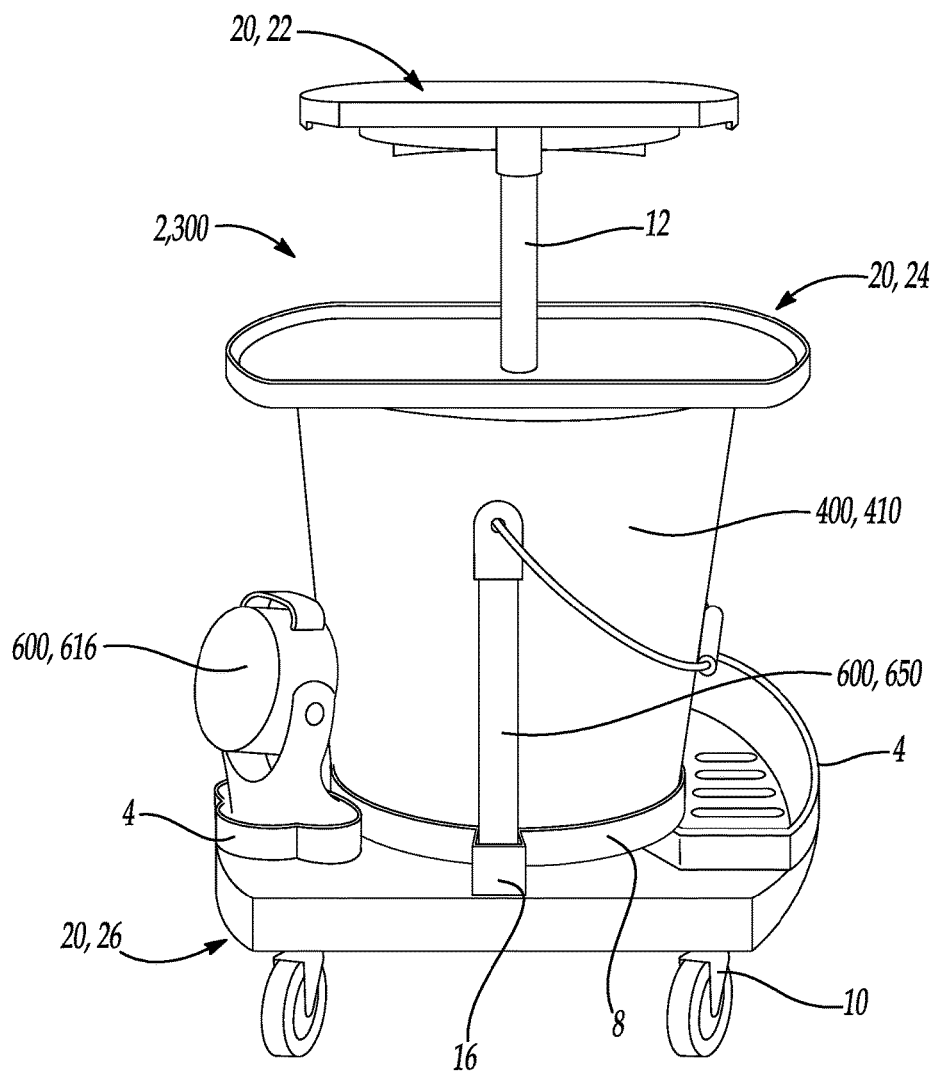
FIG. 13 illustrates a perspective view of a mobile platform.

FIG. 13 illustrates a perspective view of a mobile platform 2 shown as a small mobile platform 300. The mobile platform 2 includes three platforms 20. A plurality of wheels 10 are mounted to a bottom surface of a bottom platform 26. The bottom platform 26 includes a plurality of compartments 4. Support accessories 600 that are fans 616 are secured in the compartments 4. A cartridge 400 shown as a bucket 410 is secured in a receiving shape 8 of the bottom platform 26. The bucket 410 is prevented from rotation by a plurality of support accessories 600 that are removable vertical supports 650 secured in recesses 16 of the bottom platform 26. An intermediate platform 24 is secured to the bucket 410 by attachment keys (not shown) on a bottom surface of the intermediate platform 24. A vertical support 12 connects the intermediate platform 24 to a top platform 22.

Figure 14:
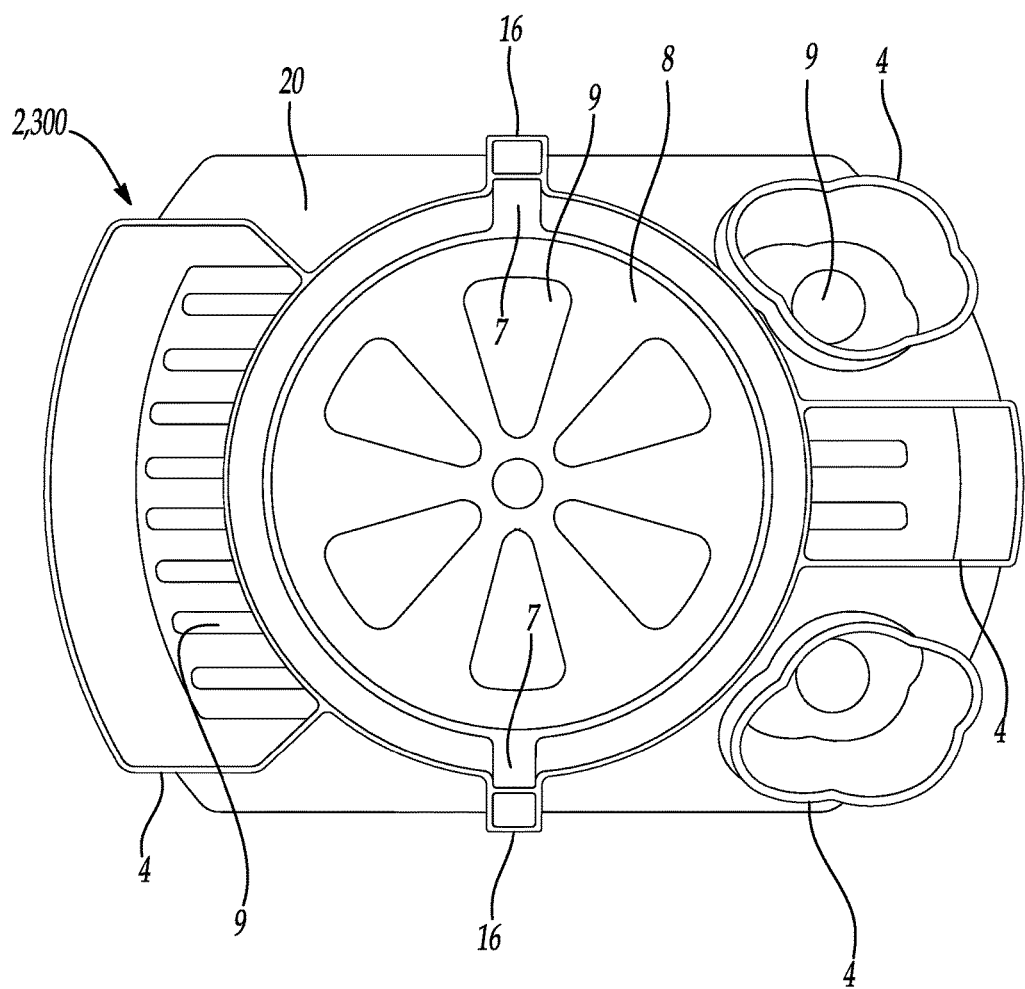
FIG. 14 illustrates a top-down view of a mobile platform.

FIG. 14 illustrates a top-down view of a mobile platform 2 shown as a small mobile platform 300. The small mobile platform 300 includes a platform 20 with a plurality of compartments 4. The platform 20 also includes a receiving shape 8 with grooves 7 to receive attachment keys (not shown) of a cartridge such as a bucket (not shown). The compartments 4 and the receiving shape 8 include a plurality of cutouts 9 to allow drainage of debris, fluids, or both from the compartments 4 and the receiving shape 8. The platform 20 also includes recesses 16 that receive support accessories (not shown).

FIG. 15 illustrates a close-up view I-I of the handle 50 attached to the platform 20 that that is the top platform 22 of FIG. 11. A shaft end 56 of the handle 50 is slid into and secured by an attachment bracket 58 mounted to a side of the top platform 22. The shaft end 56 is locked by a lock 59 to prevent the shaft end 56 from sliding out of the attachment bracket 58.

FIG. 16 illustrates cross-sectional view II-II of FIG. 15. A shaft end 56 of a shaft 50 is slid into and secured by an attachment bracket 58 attached to a side of a platform 20 that is a top platform 22. The shaft end 56 is locked by a lock 59 to prevent the shaft end 56 from sliding out of the attachment bracket 58.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

I claim:

1. A mobile platform comprising:
   (a) one or more platforms to support one or more cartridges;
   (b) one or more compartments within the one or more platforms;
   (c) one or more vertical supports connected to the one or more platforms;
   (d) a plurality of wheels connected to a bottom of the one or more platforms;
   (e) one or more recesses located in the one or more platforms to receive one or more support accessories;
   (f) a power module mounted to one of the one or more platforms, the power module comprising a rechargeable battery, wherein the rechargeable battery is enclosed within a housing;
   (g) a handle for removably attaching to a hitch of one or more additional mobile platforms so that the mobile platform moves the one or more additional mobile platforms or the one or more additional mobile platforms move the mobile platform, the handle comprising:
      (i) a grip end;
      (ii) a shaft extending from the grip end; and
      (iii) a shaft end on an opposing end of the grip end; and
   (h) an attachment bracket mounted to a side of the one or more platforms to receive the shaft end of the handle and secure the handle, wherein the attachment bracket comprises:
      (i) one or more protruding portions that receive at least a portion of the shaft end of the handle; and
      (ii) a lock that secures the shaft end within the one or more protruding portions, wherein the lock movably engages the shaft end so that the shaft end is removably secured to the attachment bracket; and
   wherein the one or more compartments are shaped to receive the one or more cartridges so that the one or more cartridges are secured to the one or more platforms during movement.

2. The mobile platform of claim 1, wherein the one or more platforms are connected by the one or more vertical supports to create a multi-tiered platform.

3. The mobile platform according to claim 1, wherein the one or more support accessories are interchangeable between one or more mobile platforms;
wherein the one or more support accessories includes a light fixture comprising:
 (a) a light; and
 (b) an attachment shaft connected to the light; and
 wherein the one or more support accessories includes a first holding device and a second holding device.

4. The mobile platform according to claim 1, wherein the power module further comprises:
 (a) a voltmeter connected to the rechargeable battery and enclosed within the housing;
 (b) a voltmeter display connected to the voltmeter and secured on an outside wall of the housing to provide a user with a voltage reading; and
 (c) one or more power outlets pressed into the housing and connected to the rechargeable battery.

5. The mobile platform of claim 1, wherein the mobile platform contains one or more motors to aid in movement of the mobile platform.

6. The mobile platform of claim 1, wherein the one or more cartridges is a bin or a bucket used to transport cargo and materials.

7. The mobile platform according to claim 4, wherein the power module contains an inverter.

8. The mobile platform according to claim 1, wherein the one or more support accessories and the one or more cartridges are interchangeable.

9. The mobile platform according to claim 8, wherein the one or more support accessories may assist in performing electrical work, plumbing, automobile maintenance, painting, general construction work, or a combination thereof.

10. The mobile platform according to claim 9, wherein the one or more support accessories are a fan, pipe holder, work light, rack, or a combination thereof.

11. The mobile platform according to claim 1, wherein the one or more protruding portions form a U-shaped channel that receives the shaft end of the handle.

12. The mobile platform according to claim 1, wherein once the handle is secured to the attachment bracket, the handle has a range of motion relative to the attachment bracket of at least 210 degrees.

13. A mobile platform comprising:
 (a) a bottom platform;
 (b) one or more vertical supports;
 (c) a top platform connected to and spaced apart from the bottom platform by the one or more vertical supports;
 (d) a plurality of wheels connected to the bottom platform;
 (e) one or more support accessories secured in one or more recesses in the top platform;
 (f) one or more compartments within the top platform shaped to receive and secure one or more cartridges during movement;
 (g) a handle for removably attaching to a hitch of one or more additional mobile platforms, the handle comprising:
  (i) a grip end;
  (ii) a shaft extending from the grip end; and
  (iii) a shaft end on an opposing end of the grip end;
 (h) an attachment bracket mounted to a side of the top platform to receive the shaft end of the handle and secure the handle, wherein the attachment bracket comprises:
  (i) one or more protruding portions that receive at least a portion of the shaft end of the handle; and
  (ii) a lock that secures the shaft end within the one or more protruding portions, wherein the lock movably engages the shaft end so that the shaft end is removably secured to the attachment bracket;
 (i) a power module attached to the bottom surface of the top platform comprising:
  (i) a housing;
  (ii) a rechargeable battery enclosed within the housing;
  (iii) a voltmeter connected to the rechargeable battery and enclosed within the housing;
  (vii) a voltmeter display connected to the voltmeter and secured on an outside wall of the housing to provide a user with a voltage reading; and
  (viii) one or more power outlets pressed into the housing and connected to the rechargeable battery; and
 (j) a seat removably secured to the top surface of the top platform, the seat comprising:
  (i) a pad located on a top surface of the seat;
  (ii) an attachment surface on a bottom surface of the seat; and
  (iii) one or more attachment hooks protruding from the attachment surface, the one or more attachment hooks for fastening the seat to the top surface of the top platform to prevent unwanted movement of the seat relative to the mobile platform during use.

14. The mobile platform according to claim 13, wherein the one or more support accessories and the one or more cartridges are interchangeable.

15. The mobile platform according to claim 1, wherein the mobile platform further comprises a seat having a pad disposed on the one of the one or more platforms.

16. The mobile platform according to claim 15, wherein the pad is secured with attachment hooks to maintain a position of the pad.

* * * * *